(12) United States Patent
Chang et al.

(10) Patent No.: US 11,009,681 B2
(45) Date of Patent: May 18, 2021

(54) PHOTOGRAPHING LENS

(71) Applicants: Sintai Optical (Shenzhen) Co., Ltd., ShenZhen (CN); Asia Optical Co., Inc., Taichung (TW)

(72) Inventors: An-Kai Chang, Taichung (TW); Ching-Chung Yeh, Taichung (TW)

(73) Assignees: Sintai Optical (Shenzhen) Co., Ltd., Shenzhen (CN); Asia Optical Co., Inc., Taichung (TW)

( * ) Notice: Subject to any disclaimer, the term of this patent is extended or adjusted under 35 U.S.C. 154(b) by 89 days.

(21) Appl. No.: 16/105,436

(22) Filed: Aug. 20, 2018

(65) Prior Publication Data
US 2019/0121092 A1   Apr. 25, 2019

(30) Foreign Application Priority Data

Oct. 25, 2017   (CN) .......................... 201711005578.6

(51) Int. Cl.
| | | |
|---|---|---|
| G02B 9/60 | (2006.01) | |
| G02B 13/18 | (2006.01) | |
| G02B 13/00 | (2006.01) | |
| G02B 9/62 | (2006.01) | |
| G02B 7/02 | (2021.01) | |

(52) U.S. Cl.
CPC ......... G02B 13/0045 (2013.01); G02B 7/028 (2013.01); G02B 9/60 (2013.01); G02B 9/62 (2013.01)

(58) Field of Classification Search
CPC ...... G02B 13/0045; G02B 7/028; G02B 9/60; G02B 9/62

USPC ................................. 359/714, 753, 763, 770
See application file for complete search history.

(56) References Cited

U.S. PATENT DOCUMENTS

| | | | |
|---|---|---|---|
| 8,116,013 B2 | 2/2012 | Yoshida | |
| 9,158,094 B1 | 10/2015 | Chen et al. | |
| 10,254,512 B2 | 4/2019 | Lai et al. | |
| 10,302,918 B2 | 5/2019 | Matsunaga | |
| 2017/0052349 A1 | 2/2017 | Yeh | |
| 2017/0153416 A1 | 6/2017 | Hsieh et al. | |
| 2018/0307000 A1* | 10/2018 | Lai | G02B 7/021 |
| 2019/0310442 A1* | 10/2019 | Ikeo | G02B 13/0045 |

FOREIGN PATENT DOCUMENTS

| | | |
|---|---|---|
| CN | 101659016 A | 10/2010 |
| CN | 104238078 A | 12/2014 |
| CN | 104330868 A | 2/2015 |
| CN | 106468824 A | 3/2017 |
| CN | 107209348 A | 9/2017 |

(Continued)

*Primary Examiner* — William Choi

(57) ABSTRACT

A photographing lens includes a first lens, a second lens, a third lens, a fourth lens, and a fifth lens in order from an object side to an image side along an optical axis. The first lens is a meniscus lens with negative refractive power. The second lens is a lens with negative refractive power, in which an image-side surface of the second lens is concave. The third lens is a lens with positive refractive power, in which an image-side surface of the third lens is convex. The fourth lens is a lens with positive refractive power. The fifth lens is a lens with negative refractive power, in which an object-side surface of the fifth lens is concave. The photographing lens has an excellent image resolving ability.

19 Claims, 18 Drawing Sheets

(56) References Cited

FOREIGN PATENT DOCUMENTS

| JP | 2016031531 A | 3/2016 |
| TW | 201425998 A | 7/2014 |
| TW | 201732357 A | 9/2017 |

* cited by examiner

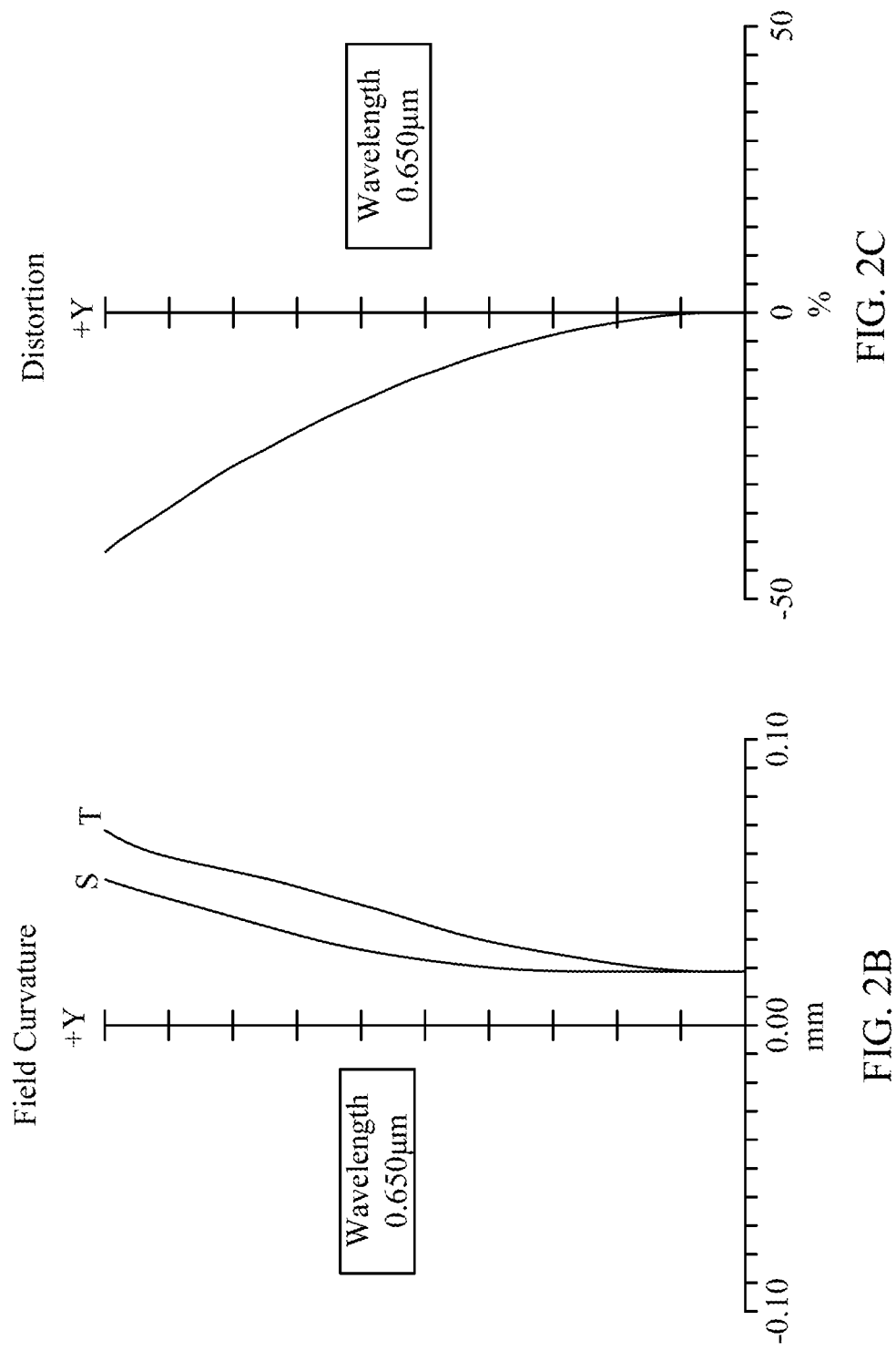

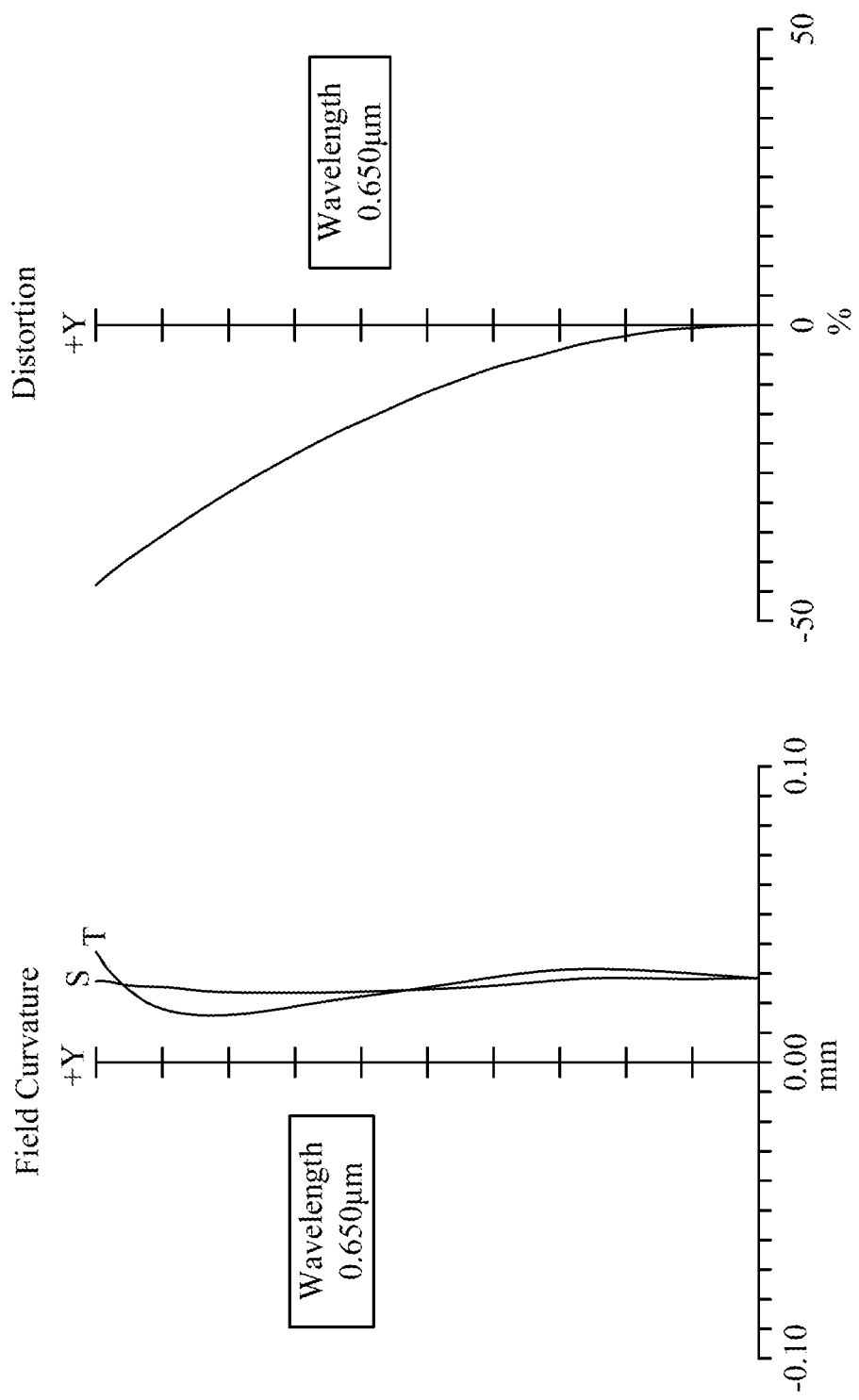

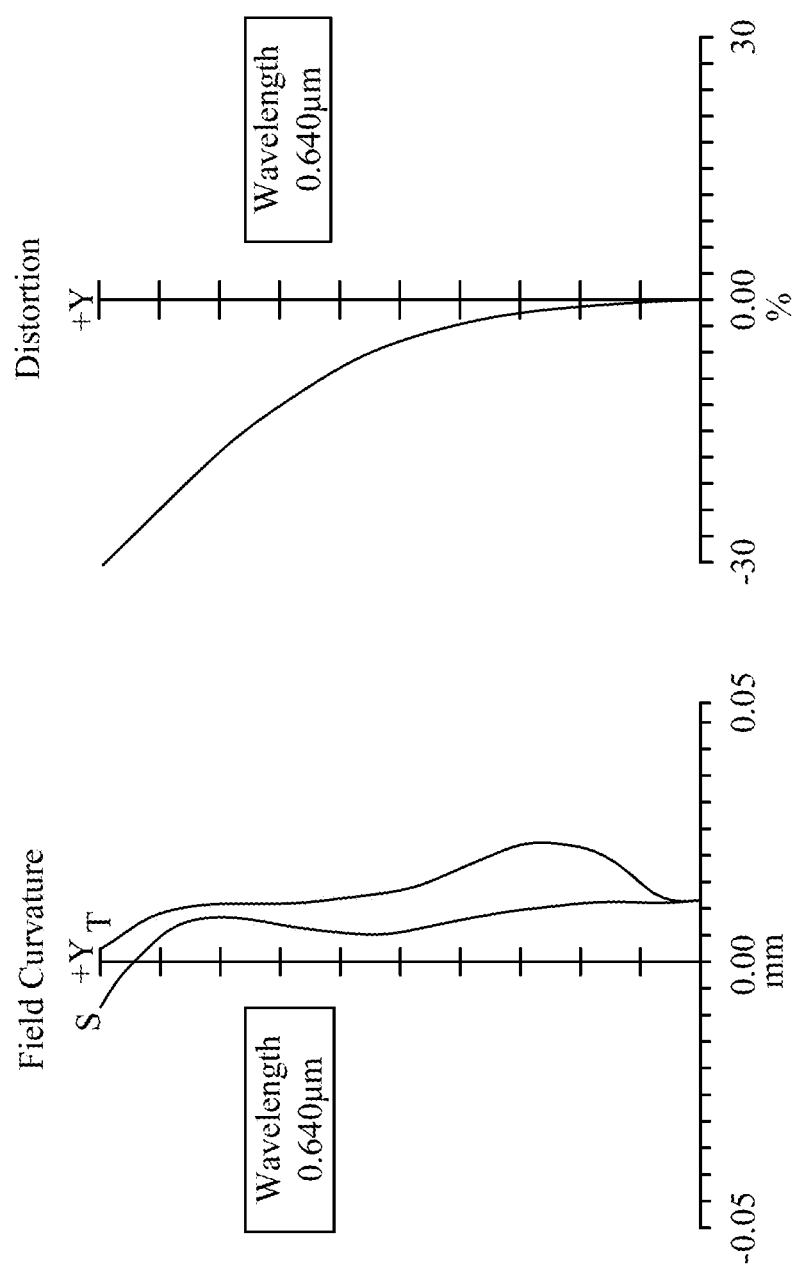

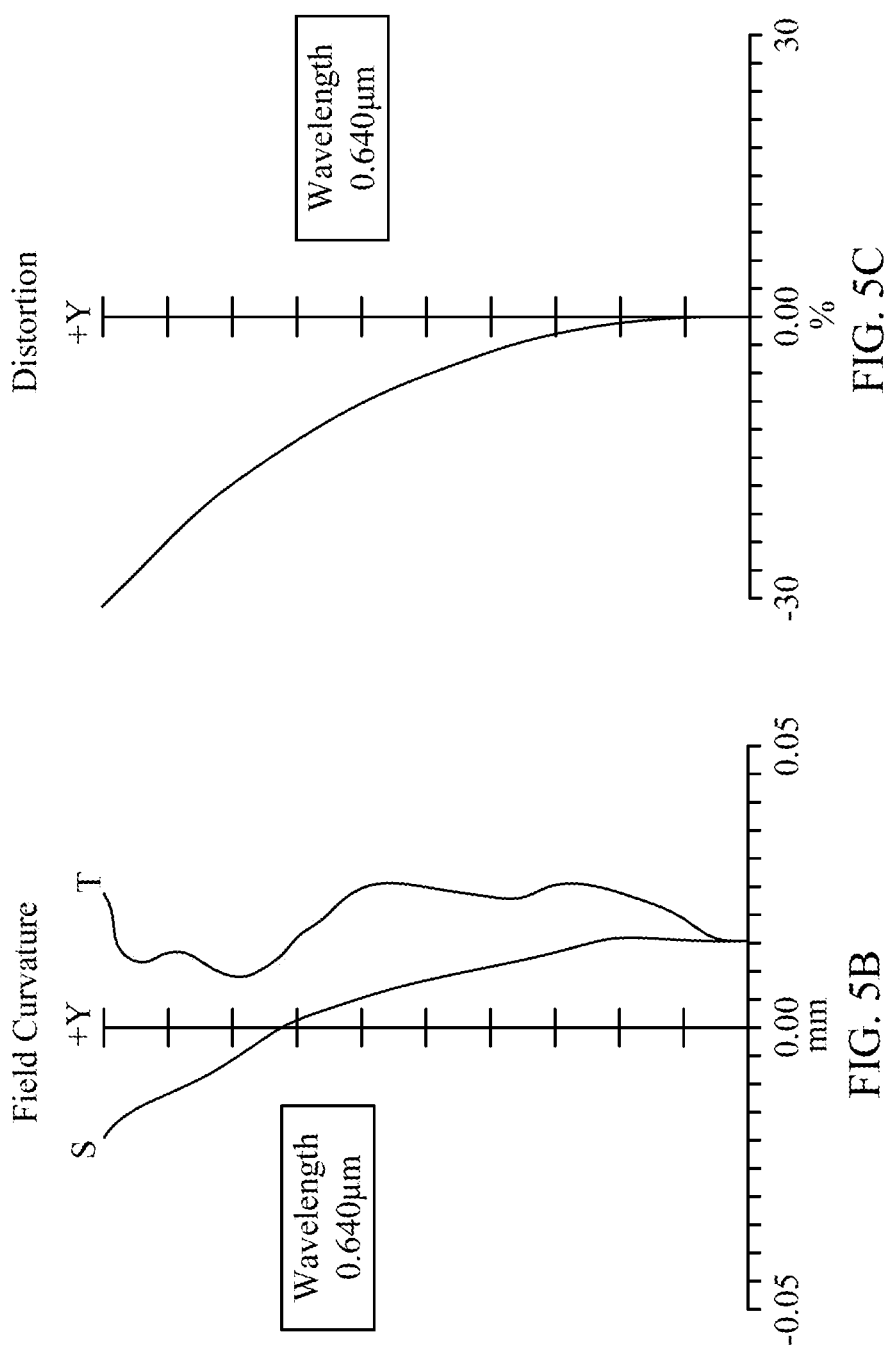

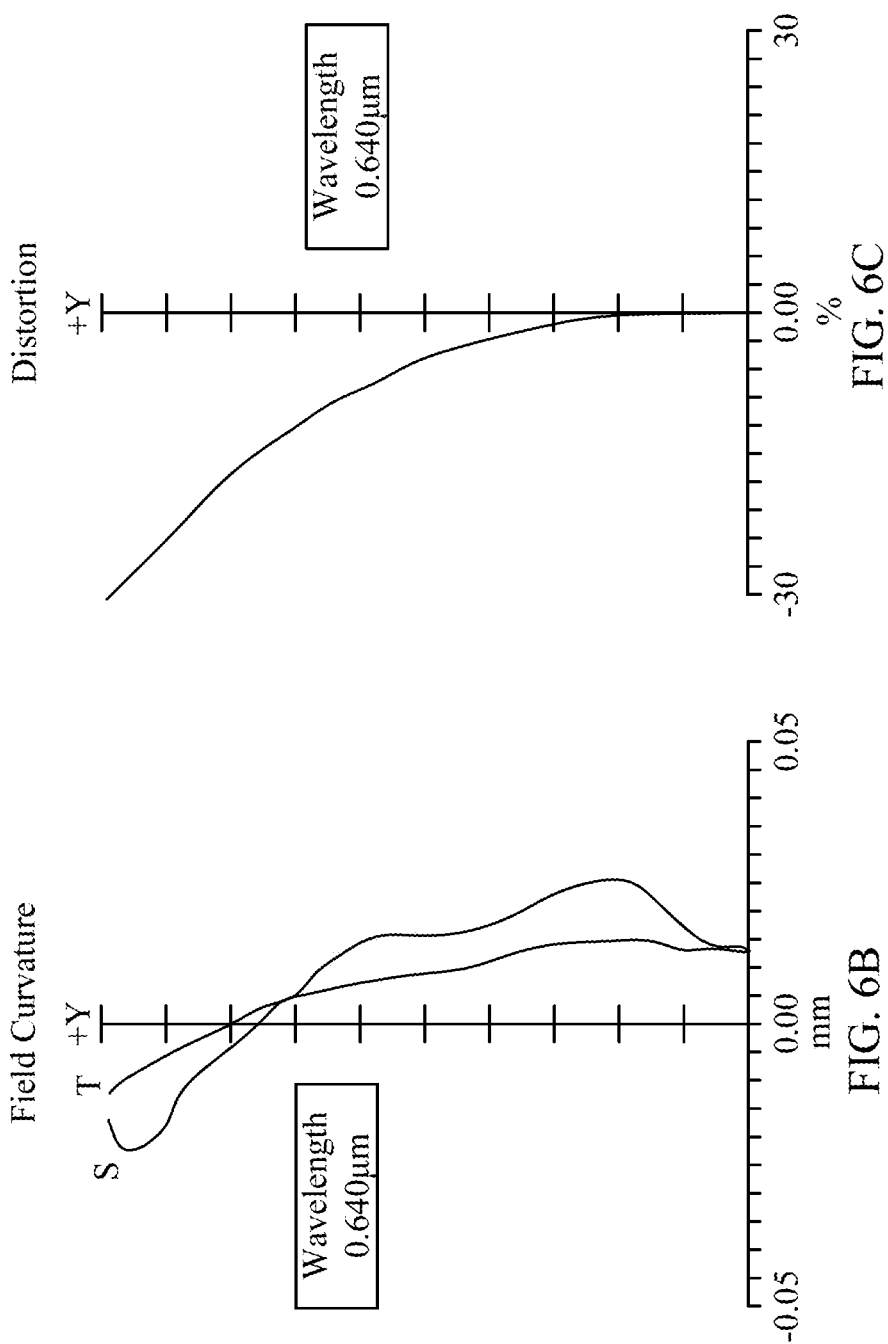

PHOTOGRAPHING LENS

TECHNICAL FIELD OF THE DISCLOSURE

The present disclosure relates to an optical element, and more particularly, to a photographing lens.

BACKGROUND OF THE DISCLOSURE

In recent years, automotive lens sets (e.g., dashboard cameras, rear view cameras, and autopilot car cameras) applied to vehicles are gradually developed. Generally, this type of cameras is used in the environment with a large temperature difference. In order to resist temperature changes, this type of cameras uses glass as the material of the lenses since coefficient of thermal expansion of plastic material is much larger than glass and it is usually difficult to compensate for temperature effects. However, the glass material is more expensive than the plastic material. It is not easy to lower down the cost using the glass material. Other cameras such as surveillance cameras and drone cameras have the same issue.

SUMMARY OF THE DISCLOSURE

The objective of the present disclosure is to provide a photographing lens, which is characterized by an excellent image resolving ability and a small number of lenses.

The present disclosure provides a photographing lens including a first lens, a second lens, a third lens, a fourth lens, and a fifth lens in order from an object side to an image side along an optical axis. The first lens is a meniscus lens with negative refractive power. An object-side surface of the first lens is convex in a paraxial region thereof and an image-side surface of the first lens is concave in a paraxial region thereof. The second lens is a lens with negative refractive power. The third lens is a biconvex lens with positive refractive power. The fourth lens is a biconvex lens with positive refractive power. The fifth lens is a lens with negative refractive power. An object-side surface of the fifth lens is concave in a paraxial region thereof.

In an embodiment, the photographing lens may further include a sixth lens disposed between the fifth lens and an image plane, wherein the sixth lens is a lens with negative refractive power, and an object-side surface of the sixth lens is convex in a paraxial region thereof and an image-side surface of the sixth lens is concave in a paraxial region thereof.

In an embodiment, an object-side surface of the second lens is concave.

In an embodiment, the photographing lens satisfies the following condition:

$$-1 \leq \frac{1}{n1f1} + \frac{1}{n2f2} + \frac{1}{n3f3} + \frac{1}{n4f4} + \frac{1}{n5f5} \leq 1;$$

and $25° < CRA < 40°$, wherein n1 is refractive index of the first lens, n2 is refractive index of the second lens, n3 is refractive index of the third lens, n4 is refractive index of the fourth lens, n5 is refractive index of the fifth lens, f1 is focal length of the first lens, f2 is focal length of the second lens, f3 is focal length of the third lens, f4 is focal length of the fourth lens, f5 is focal length of the fifth lens, and CRA is a maximum incident angle of chief ray onto an image plane.

In an embodiment, the photographing lens satisfies the following condition:

$$0.2 \leq \frac{f}{\phi L1} \leq 1; 4.5 > \frac{\phi L1}{IH} > 2; \text{ and } 2.5 > \frac{T2}{IH} > 0.5,$$

wherein f is effective focal length of the photographing lens, $\phi L1$ is a maximum effective diameter of the first lens, IH is a maximum image height on an image plane carried out by the photographing lens, and T2 is the central thickness of the second lens.

In an embodiment, the photographing lens satisfies the following condition:

$$3 > \frac{V1d}{V3d} > 0.5;$$

and $40 \geq (V4d - V5d) \geq 23$, wherein $V1d$ is Abbe number of the first lens, $V3d$ is Abbe number of the third lens, $V4d$ is Abbe number of the fourth lens, and $V5d$ is Abbe number of the fifth lens.

In an embodiment, a distance between an edge on an image-side surface of the first lens and an edge on an object-side surface of the second lens, along the optical axis, is 0 to 1 mm.

In an embodiment, the photographing lens satisfies the following condition:

$$1 \leq \frac{f3}{f} \leq 2.8; \text{ and } 4 < \frac{TTL}{f} < 10,$$

wherein f3 is focal length of the third lens, f is effective focal length of the photographing lens, and TTL is the total length of the photographing lens.

In an embodiment, the first lens and the third lens are spherical glass lenses, and the second lens, the fourth lens, and the fifth lens are plastic lenses, and an image-side surface of the fourth lens is a spherical surface.

The present disclosure provides a photographing lens including a first lens, a second lens, a third lens, a fourth lens, and a fifth lens in order from an object side to an image side along an optical axis. The first lens is a meniscus lens with negative refractive power. The second lens is a lens with negative refractive power, in which an image-side surface of the second lens is concave. The third lens is a lens with positive refractive power, in which an image-side surface of the third lens is convex. The fourth lens is a lens with positive refractive power. The fifth lens is a lens with negative refractive power, in which an object-side surface of the fifth lens is concave. The photographing lens satisfies the following condition:

$$1 > \frac{T2}{TTL} > 0.2,$$

wherein T2 is central thickness of the second lens and TTL is a total length of the photographing lens.

The present disclosure provides a photographing lens including a first lens, a second lens, a third lens, a fourth lens, and a fifth lens in order from an object side to an image side along an optical axis. The first lens is a meniscus lens with negative refractive power. The second lens is a lens with negative refractive power, in which an image-side surface of the second lens is concave. The third lens is a lens with positive refractive power, in which an image-side surface of the third lens is convex. The fourth lens is a lens with positive refractive power. The fifth lens is a biconcave lens with negative refractive power.

The photographing lens of the present disclosure is characterized by an excellent image resolving ability and a small number of lenses. Moreover, in the embodiments, the present disclosure can adopt a specific combination of plastic and glass lenses to compensate for temperature effects and can lower the cost while the optical performance maintains within a certain degree.

BRIEF DESCRIPTION OF THE DRAWINGS

FIGS. 2B to 2D are diagrams illustrating field curvature, distortion, and longitudinal aberration according to the second embodiment of the present disclosure, respectively.

FIGS. 3B to 3D are diagrams illustrating field curvature, distortion, and longitudinal aberration according to the third embodiment of the present disclosure, respectively.

FIGS. 4B to 4D are diagrams illustrating field curvature, distortion, and longitudinal aberration according to the fourth embodiment of the present disclosure, respectively.

FIGS. 5B to 5D are diagrams illustrating field curvature, distortion, and longitudinal aberration according to the fifth embodiment of the present disclosure, respectively.

FIGS. 6B to 6D are diagrams illustrating field curvature, distortion, and longitudinal aberration according to the sixth embodiment of the present disclosure, respectively.

DETAILED DESCRIPTION OF THE DISCLOSURE

To make the objectives, technical schemes, and technical effects of the present disclosure more clearly and apparently, the present disclosure will be described in details below using embodiments in conjunction with the appending drawings.

Figure 1A:
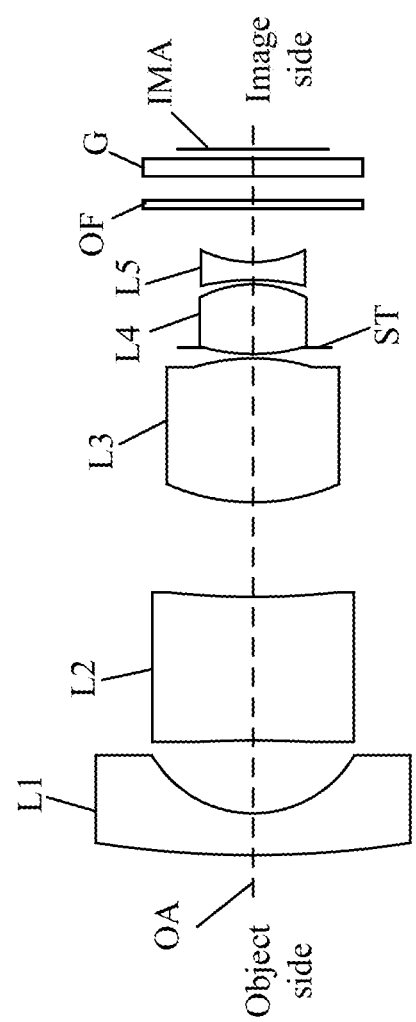
FIG. 1A is a schematic diagram showing a photographing lens according to a first embodiment of the present disclosure.
Figure 2A:
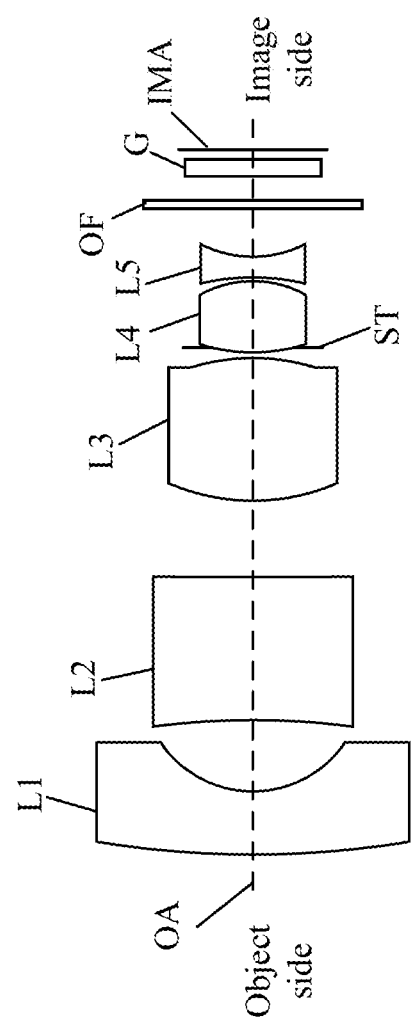
FIG. 2A is a schematic diagram showing a photographing lens according to a second embodiment of the present disclosure.
Figure 3A:
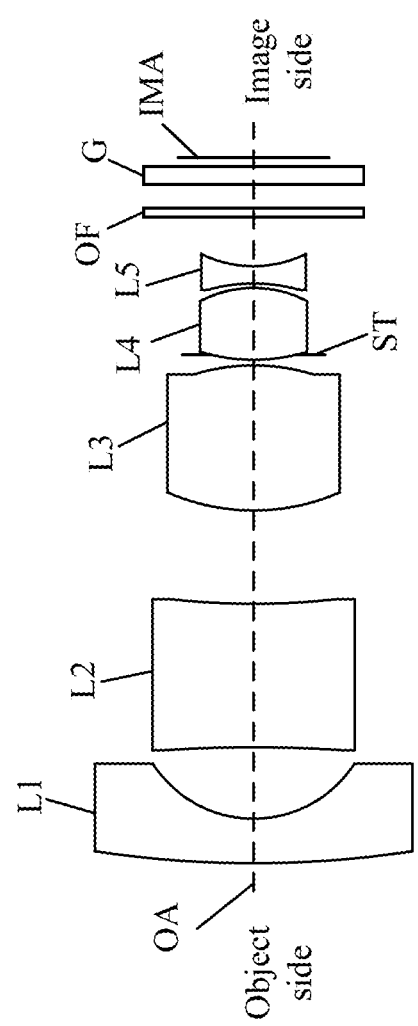
FIG. 3A is a schematic diagram showing a photographing lens according to a third embodiment of the present disclosure.

Referring to FIGS. 1A, 2A, and 3A, the photographing lens of the present disclosure includes a first lens L1, a second lens L2, a third lens L3, a fourth lens L4, and a fifth lens L5 in order from an object side to an image side along an optical axis OA. In addition, the photographing lens further includes an aperture stop ST located between an image-side surface of the third lens L3 and an object-side surface of the fourth lens L4, and an optical filter OF and a protective glass G that are located between the fifth lens L5 and an image plane IMA.

The first lens L1 is a meniscus lens with negative refractive power. An object-side surface of the first lens L1 is convex in a paraxial region thereof. An image-side surface of the first lens L1 is concave in a paraxial region thereof. The second lens L2 is a lens with negative refractive power. The third lens L3 is a biconvex lens with positive refractive power. The fourth lens L4 is a biconvex lens with positive refractive power. The fifth lens L5 is a lens with negative refractive power. An object-side surface of the fifth lens L5 is concave in a paraxial region thereof.

Figure 4A:
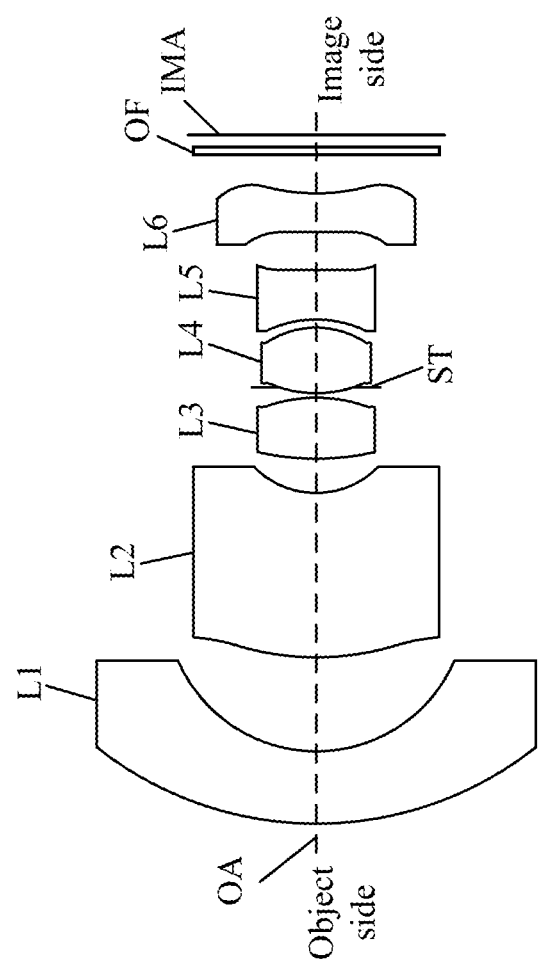
FIG. 4A is a schematic diagram showing a photographing lens according to a fourth embodiment of the present disclosure.
Figure 5A:
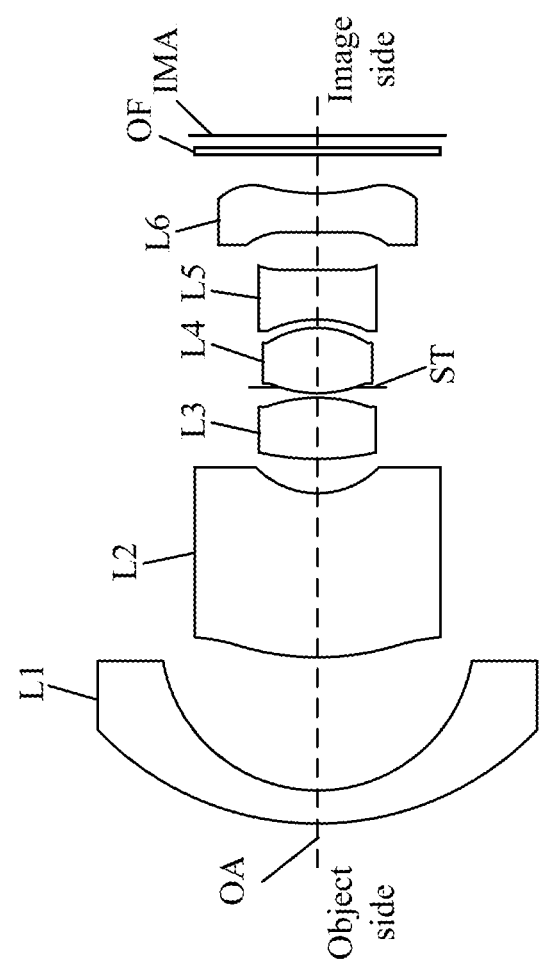
FIG. 5A is a schematic diagram showing a photographing lens according to a fifth embodiment of the present disclosure.
Figure 6A:
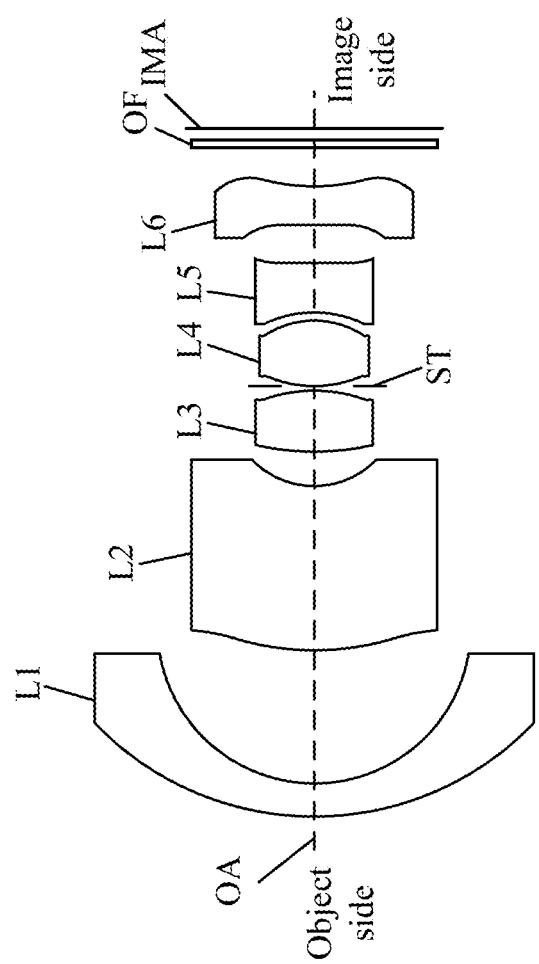
FIG. 6A is a schematic diagram showing a photographing lens according to a sixth embodiment of the present disclosure.

Referring to FIGS. 4A, 5A, and 6A, in the photographing lens of the present disclosure, another lens may be added based on the afore-described structure with five lenses. That is, the photographing lens further includes a sixth lens L6 disposed between the fifth lens L5 and the image plane IMA, constructing an optical structure with six lenses. Specifically, the sixth lens L6 is a lens with negative refractive power. An object-side surface of the sixth lens L6 is convex in a paraxial region thereof. An image-side surface of the sixth lens L6 is concave in a paraxial region thereof.

The photographing lens of the present disclosure is characterized by an excellent image resolving ability and a small number of lenses. The photographing lens is useful in automotive lens sets, surveillance cameras, and drone cameras, but is not limited thereto. The photographing lens is also applicable to various image capturing devices equipped with cameras. For example, the image capturing devices can be personal information terminals (e.g., cell phones, smartphones, and tablets), wearable devices, IP CAMs, game consoles. and 3D image capturing devices.

The second lens L2 can be a biconcave lens. Alternatively, the second lens L2 can be a lens, of which an object-side surface is convex in a paraxial region thereof and an image-side surface is concave in a paraxial region thereof.

The fifth lens L5 can be a biconcave lens. Alternatively, the fifth lens L5 can be a lens, of which an object-side surface is concave in a paraxial region thereof and an image-side surface is convex in a paraxial region thereof.

Preferably, the first lens L1 and the third lens L3 are spherical glass lenses, and the second lens L2, the fourth lens L4, and the fifth lens L5 are plastic lenses. This can resist ambient temperature changes and keep excellent image resolving quality under condition of low cost. Of course, the present disclosure can also be achieved by other types of combinations of glass lenses and plastic lenses, and other types of combinations of spherical lenses and aspheric lenses.

In the present disclosure, preferably, an image-side surface (L4R2) of the fourth lens L4 is a spherical surface. Of course, the fourth lens L4 can also be carried out by an aspheric lens.

In the photographing lens, each of object-side and image-side surfaces of the lenses can be aspheric surfaces (ASP). The use of aspheric surfaces can have more console variables to reduce aberration, thereby reducing the number of lenses and the total length of the photographing lens. Preferably, the object-side and image-side surfaces (L2R1 and L2R2) of the second lens L2, the object-side surface (L4R1) of the fourth lens L4, and the object-side and image-side surfaces (L5R1 and L5R2) of the fifth lens L5 are aspheric surfaces. Preferably, the object-side and image-side surfaces (L2R1, L2R2, L3R1, L3R2, L4R1, L4R2, L5R1, L5R2, L6R1, and L6R2) of the second lens L2 to the sixth lens L6 are aspheric surfaces.

Further, in order to enable the photographing lens of the present disclosure to possess an excellent optical performance, the photographing lens of the present disclosure may satisfy the following conditions.

Field curvature of the photographing lens of the present disclosure may further satisfy the following condition:

$$-1 \leq \frac{1}{n1f1} + \frac{1}{n2f2} + \frac{1}{n3f3} + \frac{1}{n4f4} + \frac{1}{n5f5} \leq 1, \quad (1)$$

wherein n1 is the refractive index of the first lens, n2 is the refractive index of the second lens, n3 is the refractive index of the third lens, n4 is the refractive index of the fourth lens, n5 is the refractive index of the fifth lens, f1 is the focal length of the first lens, f2 is the focal length of the second lens, f3 is the focal length of the third lens, f4 is the focal length of the fourth lens, f5 is the focal length of the fifth lens, and wherein $$\frac{1}{n1f1} + \frac{1}{n2f2} + \frac{1}{n3f3} + \frac{1}{n4f4} + \frac{1}{n5f5}$$

is Petzval sum. That is to say, the photographing lens of the present disclosure has insignificant field curvature and images projected on the image plane IMA will not be dramatically distorted.

The photographing lens of the present disclosure may further satisfy the following condition:

$$0.2 \leq \frac{f}{L1R1Rm} \leq 1, \quad (2)$$

wherein f is the effective focal length of the photographing lens (with dimension in mm) and L1R1Rm is the maximum effective diameter of the first lens (with dimension in mm), which can also be labeled by ΦL1. In this way, the total length of the photographing lens is effectively controlled to achieve miniaturization.

In order to possess a further excellent optical performance, the photographing lens of the present disclosure may further satisfy the following condition:

$$40 \geq (V4d - V5d) \geq 23, \quad (3)$$

wherein V4d is Abbe number of the fourth lens L4, and V5d is Abbe number of the fifth lens L5.

Further, in the photographing lens of the present disclosure, a distance between an edge on the image-side surface (L1R2) of the first lens L1 and the edge on an object-side surface (L2R1) of the second lens L2, along the optical axis OA, is 0 to 1 mm.

The photographing lens of the present disclosure may further satisfy the following condition:

$$1 \leq \frac{f3}{f} \leq 2.8, \quad (4)$$

wherein f3 is the focal length of the third lens, f is the effective focal length of the photographing lens. In this way, refractive power arrangement of the photographing lens can be adjusted to satisfy various applications.

In order to control lens thickness, the photographing lens of the present disclosure may further satisfy the following condition:

$$1 > \frac{T2}{TTL} > 0.2, \quad (5)$$

wherein T2 is the central thickness of the second lens L2 (with dimension in mm) and TTL is the total length of the photographing lens (with dimension in mm), which is a distance along the optical axis OA between the object-side surface of the first lens L1 and the image plane IMA.

The photographing lens of the present disclosure may further satisfy the following condition:

$$4 < \frac{TTL}{f} < 10, \quad (6)$$

wherein TTL is the total length of the photographing lens and f is the effective focal length of the photographing lens. In this way, the total length of the photographing lens is effectively controlled as well as it is capable of photographing a distanced object.

The photographing lens of the present disclosure may further satisfy the following condition:

$$25° < CRA < 40°, \quad (7)$$

wherein CRA is a maximum incident angle of chief ray onto the image plane IMA.

The photographing lens of the present disclosure may further satisfy the following condition:

$$4.5 > \frac{\phi L1}{IH} > 2, \quad (8)$$

wherein ΦL1 is the maximum effective diameter of the first lens L1 (with dimension in mm), IH is the maximum image height or radius on the image plane IMA (with dimension in mm) carried out by the photographing lens.

The photographing lens of the present disclosure may further satisfy the following condition:

$$2.5 > \frac{T2}{IH} > 0.5, \quad (9)$$

wherein T2 is the central thickness of the second lens L2 (with dimension in mm) and IH is the maximum image height or radius on the image plane IMA (with dimension in mm) carried out by the photographing lens.

In order to possess a further excellent optical performance, the photographing lens of the present disclosure may further satisfy the following condition:

$$3 > \frac{V1d}{V3d} > 0.5, \quad (10)$$

wherein V1d is Abbe number of the first lens L1, V3d is Abbe number of the third lens L3.

The photographing lens of the present disclosure may further satisfy the following condition:

$$6 < \frac{TTL}{f} < 10, \quad (11)$$

wherein TTL is the total length of the photographing lens and f is the effective focal length of the photographing lens. In this way, the total length of the photographing lens is effectively controlled as well as it is capable of photographing a distanced object.

The photographing lens of the present disclosure will be described in further detail with reference to the following embodiments.

The shape of an aspheric lens can be expressed by the following formula:

$$D = \frac{C \cdot H^2}{1 + \sqrt{1 - (1+K) \cdot C^2 \cdot H^2}} + E_4 H^4 + E_6 H^6 + E_8 H^8 + E_{10} H^{10} + E_{12} H^{12}$$

wherein D represents the sag of a point on the aspheric surface at a height distanced to a central axis of the lens; C is a reciprocal of a paraxial curvature radius; H represents a height of a point on the aspheric surface with respect to the central axis; K is the conic constant of the aspheric lens; and $E_4$ to $E_{12}$ are aspheric surface coefficients for even (greater than or equal to four) order terms.

First Embodiment

Figures 1B, 1C:
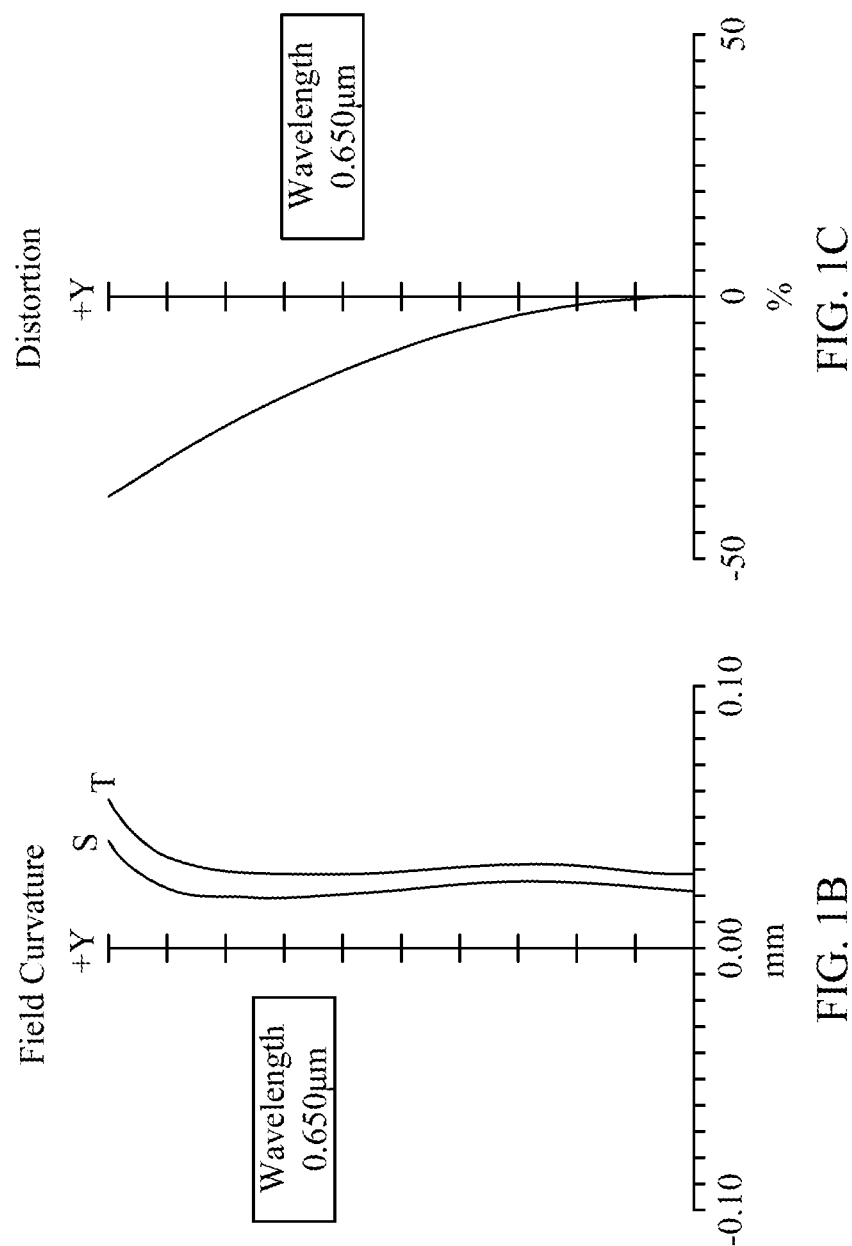
FIGS. 1B to 1D are diagrams illustrating field curvature, distortion, and longitudinal aberration according to the first embodiment of the present disclosure, respectively.
Figure 1D:
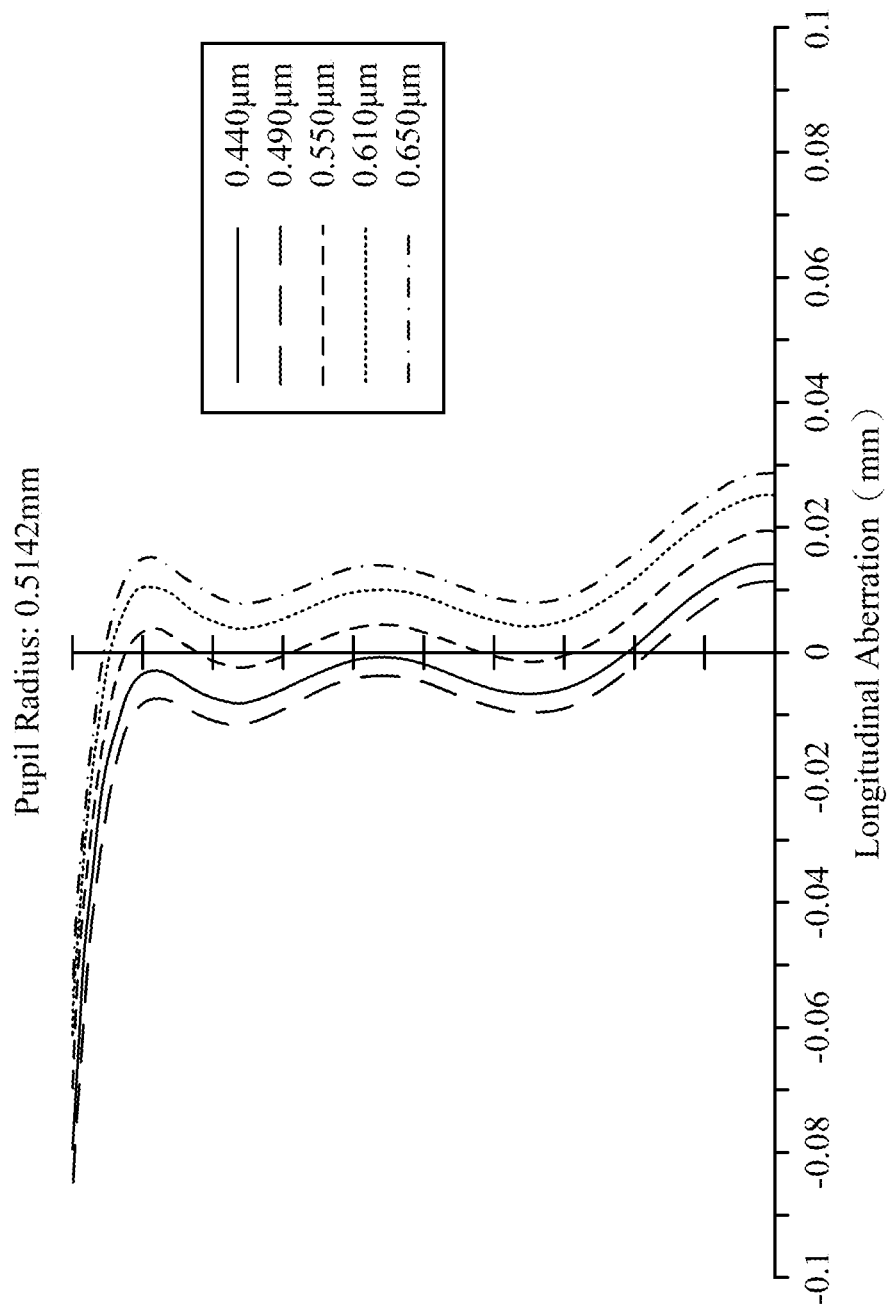

Please refer to FIGS. 1A to 1D. FIG. 1A is a schematic diagram showing a photographing lens according to a first embodiment of the present disclosure and FIGS. 1B to 1D are diagrams illustrating field curvature, distortion, and longitudinal aberration according to the first embodiment of the present disclosure, respectively. In the first embodiment, the photographing lens is an optical structure with five lenses (i.e., L1 to L5). The second lens L2 and the fifth lens L5 are biconcave lenses. In Table 1, related parameters of each lens of the photographing lens shown in FIG. 1A are illustrated. In Table 2, related parameters of aspheric surfaces of each lens of the photographing lens in Table 1 are illustrated. The Petzval sum is −0.014, i.e., between −1 and 1. The effective focal length of the photographing lens is 1.8942 mm and the maximum effective diameter (i.e., L1R1Rm) of the first lens L1 is 7.2 mm. Accordingly, $$\frac{f}{L1R1Rm} = 0.263,$$

i.e., between 0.2 and 1. The Abbe number of the fourth lens L4 is 56 and the Abbe number of the fifth lens L5 is 23. Accordingly, (V4d−V5d)=33, i.e., between 23 and 40. The distance between an edge on L1R2 surface and an edge on L2R1 surface, along the optical axis, is 0.298 mm, i.e., between 0 and 1 mm. The focal length of the third lens L3 is 4.6429 mm. Accordingly, $$\frac{f3}{f} = 2.45,$$

i.e., between 1 and 2.8. The central thickness T2 of the second lens L2 is 3.289 mm and the total length of the photographing lens is 15.915 mm. Accordingly, T2/TTL=0.207, i.e., between 0.2 and 1, and TTL/f=8.402, i.e., between 4.4 and 10. CRA is 26.05 degrees, i.e., between 25 and 40 degrees. IH is 1.7 mm. Accordingly, $$\frac{\phi L1}{IH} = 4.235,$$

i.e., between 2 and 4.5, and $$\frac{T2}{IH} = 1.935,$$

i.e., between 0.5 and 2.5. The Abbe number of the first lens L1 is 53 and the Abbe number of the third lens L3 is 63. Accordingly, $$\frac{V1d}{V3d} = 0.841,$$

i.e., between 0.5 and 3.

If the condition (4), f3/f, is less than 1, manufacturability of the photographing lens is not good enough and rays are too converged to get an excellent image resolving ability in peripheral regions. If the condition (4), f3/f, is greater than 2.8, rays are too diverged and the total length of the photographing lens is too large to meet the requirements of miniaturization. Accordingly, the value of f3/f has to be at least greater than 1. A preferred range is $$1 \leq \frac{f3}{f} \leq 2.8.$$

A value within this range can better achieve the balance between the optical performance and the manufacturability. If the value of f3/f increases, better manufacturability is obtained. If the value of f3/f decreases, better image resolving ability in peripheral regions is obtained.

If the condition (11), TTL/f, is greater than 10, then it is difficult to achieve miniaturization. Accordingly, the value of TTL/f has to be at least less than 10. A preferred range is $$6 < \frac{TTL}{f} < 10.$$

A value within this range is a preferred condition in minimizing the photographing lens.

TABLE 1

| Lens No. | Surface Index | Radius of Curvature R (mm) | Thickness/ Distance D (mm) | Refractive Index Nd | Abbe No. Vd |
|---|---|---|---|---|---|
| | Object Surface | ∞ | ∞ | | |
| L1 | 1 | 23.51 | 0.943 | 1.72 | 53 |
| | 2 | 2.733 | 1.635 | | |
| L2 | 3 | −273.841 | 3.289 | 1.66 | 20.4 |
| | 4 | 62.909 | 2.156 | | |

TABLE 1-continued

| Lens No. | Surface Index | Radius of Curvature R (mm) | Thickness/ Distance D (mm) | Refractive Index Nd | Abbe No. Vd |
|---|---|---|---|---|---|
| L3 | 5 | 4.973 | 3.277 | 1.61 | 63 |
|  | 6 | −4.973 | 0.231 |  |  |
| ST | 7(ST) | ∞ | −0.131 |  |  |
| L4 | 8 | 3.441 | 1.602 | 1.54 | 56 |
|  | 9 | −2.592 | 0.09 |  |  |
| L5 | 10 | −5.675 | 0.412 | 1.64 | 23 |
|  | 11 | 2.614 | 1.2 |  |  |
| OF | 12 | ∞ | 0.21 | 1.52 | 54.5 |
|  | 13 | ∞ | 0.54 |  |  |
| G | 14 | ∞ | 0.4 | 1.50 | 64.2 |
|  | 15 | ∞ | 0.2 |  |  |

TABLE 2

| Surface Index | K | E4 | E6 | E8 | E10 | E12 |
|---|---|---|---|---|---|---|
| 3 | 0 | −1.243E−03 | −5.12E−05 | −1.966E−05 | 1.343E−05 | −1.441E−06 |
| 4 | −164.364 | 2.514E−03 | −5.718E−04 | 4.702E−04 | −9.439E−05 | 8.644E−06 |
| 8 | −0.288 | −5.480E−04 | −0.038 | 0.055 | −0.044 | 0.013 |
| 10 | 4.605 | −0.045 | 0.047 | −0.013 | −5.787E−04 | 8.940E−04 |
| 11 | −0.432 | −0.046 | 0.061 | −0.055 | 0.043 | −0.015 |

Second Embodiment

Figure 2D:
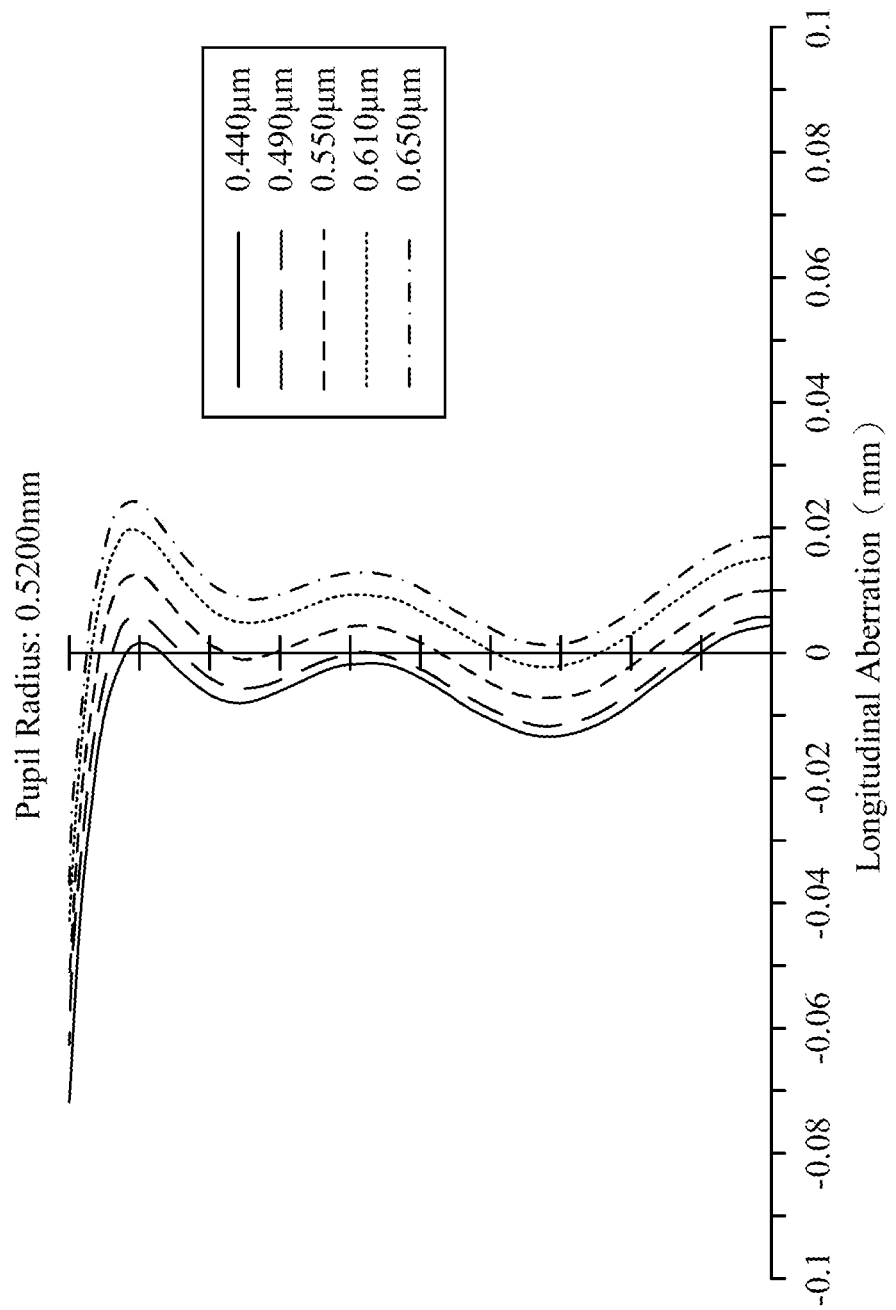

Please refer to FIGS. 2A to 2D. FIG. 2A is a schematic diagram showing a photographing lens according to a second embodiment of the present disclosure and FIGS. 2B to 2D are diagrams illustrating field curvature, distortion, and longitudinal aberration according to the second embodiment of the present disclosure, respectively. In the second embodiment, the photographing lens is an optical structure with five lenses (i.e., L1 to L5). The second lens L2 and the fifth lens L5 are biconcave lenses. In Table 3, related parameters of each lens of the photographing lens shown in FIG. 2A are illustrated. In Table 4, related parameters of aspheric surfaces of each lens of the photographing lens in Table 3 are illustrated. The Petzval sum is −0.03, i.e., between −1 and 1. The effective focal length of the photographing lens is 1.8922 mm and the maximum effective diameter (i.e., L1R1Rm) of the first lens L1 is 7.2 mm. Accordingly, $$\frac{f}{L1R1Rm} = 0.263,$$

i.e., between 0.2 and 1. The Abbe number of the fourth lens L4 is 55 and the Abbe number of the fifth lens L5 is 25. Accordingly, (V4d−V5d)=30, i.e., between 23 and 40. The distance between an edge on L1R2 surface and an edge on L2R1 surface, along the optical axis, is 0.337 mm, i.e., between 0 and 1 mm. The focal length of the third lens L3 is 4.6225 mm. Accordingly, $$\frac{f3}{f} = 2.44,$$

i.e., between 1 and 2.8. The central thickness T2 of the second lens L2 is 3.284 mm and the total length of the photographing lens is 16.124 mm. Accordingly, T2/TTL=0.204, i.e., between 0.2 and 1, and TTL/f=8.521, i.e., between 4.4 and 10. CRA is 26.93 degrees, i.e., between 25 and 40 degrees. IH is 1.7 mm. Accordingly, $$\frac{\phi L1}{IH} = 4.235,$$

i.e., between 2 and 4.5, and $$\frac{T2}{IH} = 1.932,$$

i.e., between 0.5 and 2.5. The Abbe number of the first lens L1 is 54 and the Abbe number of the third lens L3 is 66. Accordingly, $$\frac{V1d}{V3d} = 0.818,$$

i.e., between 0.5 and 3.

If the condition (3), (V4d−V5d), is less than 23, the ability to eliminate chromatic aberration is not good enough. The two lenses used to eliminate chromatic aberration have to be more curved. However, high order aberrations may occur if the curvature radius R is too small. Accordingly, the value of (V4d−V5d) has to be at least greater than or equal to 23. A preferred range is 40≥(V4d−V5d)≥23. A value within this range is a preferred condition to eliminate chromatic aberration.

If the condition (11), TTL/f, is greater than 10, then it is difficult to achieve miniaturization. Accordingly, the value of TTL/f has to be at least less than 10. A preferred range is $$6 < \frac{TTL}{f} < 10.$$

A value within this range is a preferred condition in minimizing the photographing lens.

TABLE 3

| Lens No. | Surface Index | Radius of Curvature R (mm) | Thickness/ Distance D (mm) | Refractive Index Nd | Abbe No. Vd |
|---|---|---|---|---|---|
|  | Object Surface | ∞ | ∞ |  |  |
| L1 | 1 | 26.605 | 1.45 | 1.70 | 54 |
|  | 2 | 2.615 | 1.604 |  |  |
| L2 | 3 | −125.547 | 3.284 | 1.68 | 22 |
|  | 4 | 73.522 | 1.708 |  |  |

TABLE 3-continued

| Lens No. | Surface Index | Radius of Curvature R (mm) | Thickness/ Distance D (mm) | Refractive Index Nd | Abbe No. Vd |
|---|---|---|---|---|---|
| L3 | 5 | 4.773 | 3.282 | 1.59 | 66 |
|  | 6 | -4.773 | 0.162 |  |  |
| ST | 7(ST) | ∞ | -0.074 |  |  |
| L4 | 8 | 3.451 | 1.665 | 1.57 | 55 |
|  | 9 | -2.438 | 0.083 |  |  |
| L5 | 10 | -5.183 | 0.473 | 1.62 | 25 |
|  | 11 | 2.309 | 1.073 |  |  |
| OF | 12 | ∞ | 0.21 | 1.52 | 54.5 |
|  | 13 | ∞ | 0.53 |  |  |
| G | 14 | ∞ | 0.4 | 1.5 | 64.2 |
|  | 15 | ∞ | 0.2 |  |  |

TABLE 4

| Surface Index | k | A4 | A6 | A8 | A10 | A12 |
|---|---|---|---|---|---|---|
| 3 | 0 | -2.756E-03 | -3.535E-04 | -1.616E-05 | 1.198E-05 | -1.608E-06 |
| 4 | -200.003 | 8.959E-04 | -6.752E-04 | 4.503E-04 | -9.970E-05 | 1.074E-06 |
| 8 | -0.807 | -1.867E-03 | -0.038 | 0.055 | -0.045 | 0.013 |
| 10 | 3.359 | -0.043 | 0.046 | -0.014 | 4.684E-04 | 9.531E-04 |
| 11 | -0.285 | -0.044 | 0.060 | -0.056 | 0.041 | -0.013 |

Third Embodiment

Figure 3D:
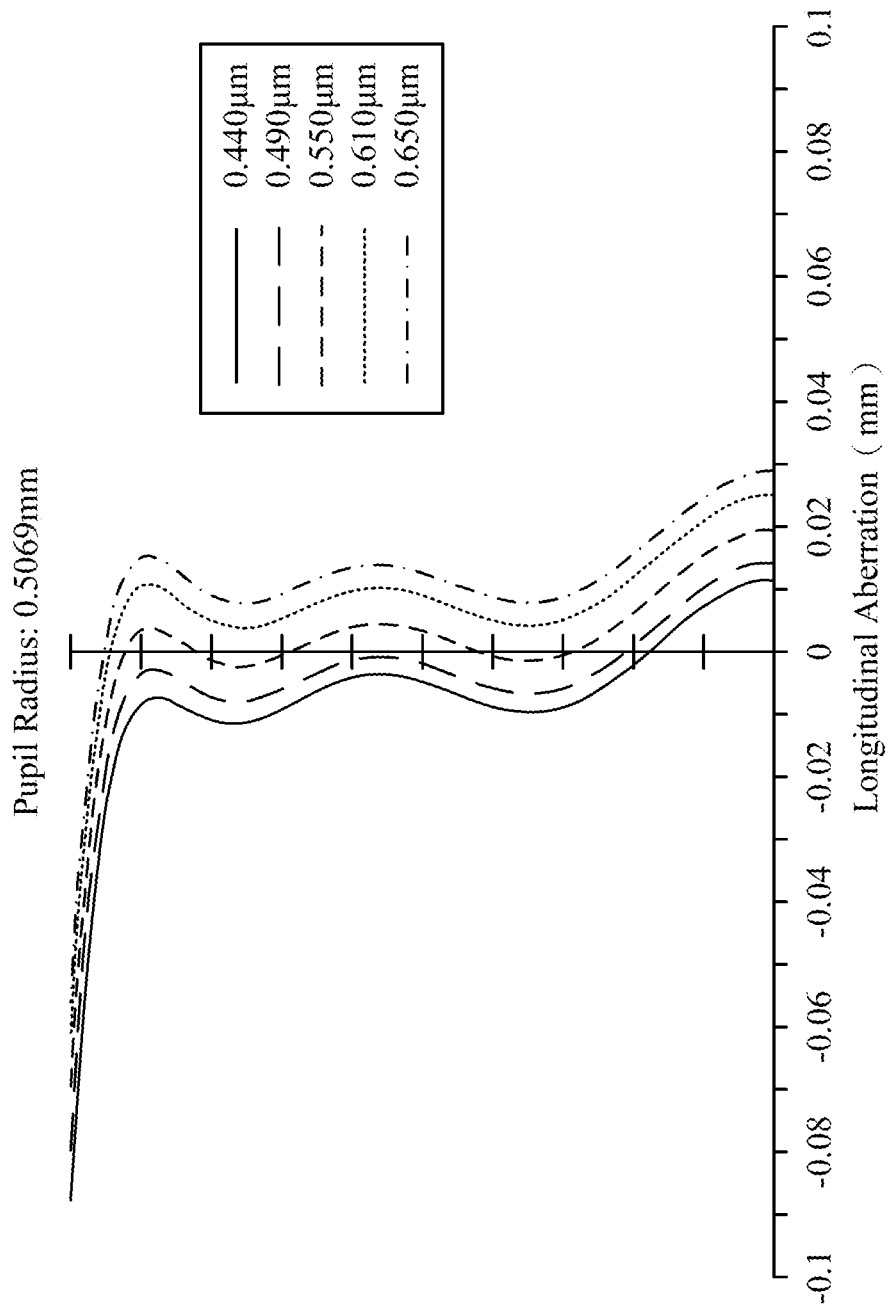

Please refer to FIGS. 3A to 3D. FIG. 3A is a schematic diagram showing a photographing lens according to a third embodiment of the present disclosure and FIGS. 3B to 3D are diagrams illustrating field curvature, distortion, and longitudinal aberration according to the third embodiment of the present disclosure, respectively. In the third embodiment, the photographing lens is an optical structure with five lenses (i.e., L1 to L5). The second lens L2 and the fifth lens L5 are biconcave lenses. In Table 5, related parameters of each lens of the photographing lens shown in FIG. 3A are illustrated. In Table 6, related parameters of aspheric surfaces of each lens of the photographing lens in Table 5 are illustrated. The Petzval sum is -0.015, i.e., between -1 and 1. The effective focal length of the photographing lens is 1.8143 mm and the maximum effective diameter (i.e., L1R1Rm) of the first lens L1 is 7.2 mm. Accordingly, $$\frac{f}{L1R1Rm} = 0.252,$$

i.e., between 0.2 and 1. The Abbe number of the fourth lens L4 is 55 and the Abbe number of the fifth lens L5 is 23. Accordingly, $(V4d-V5d)=32$, i.e., between 23 and 40. The distance between an edge on L1R2 surface and an edge on L2R1 surface, along the optical axis, is 0.29 mm, i.e., between 0 and 1 mm. The focal length of the third lens L3 is 4.5139 mm. Accordingly, $$\frac{f3}{f} = 2.488,$$

i.e., between 1 and 2.8. The central thickness T2 of the second lens L2 is 3.283 mm and the total length of the photographing lens is 16.063 mm. Accordingly, T2/TTL=0.204, i.e., between 0.2 and 1, and TTL/f=8.854, i.e., between 4.4 and 10. CRA is 26.67 degrees, i.e., between 25 and 40 degrees. IH is 1.7 mm. Accordingly, $$\frac{\phi L1}{IH} = 4.235,$$

i.e., between 2 and 4.5, and $$\frac{T2}{IH} = 1.931,$$

i.e., between 0.5 and 2.5. The Abbe number of the first lens L1 is 52 and the Abbe number of the third lens L3 is 60. Accordingly, $$\frac{V1d}{V3d} = 0.867,$$

i.e., between 0.5 and 3.
If the condition (10), $$\frac{V1d}{V3d},$$

is less than 0.5, the ability to eliminate chromatic aberration is not good enough. Accordingly, the value of $$\frac{V1d}{V3d}$$

has to be at least greater than 0.5. A preferred range is $$3 > \frac{V1d}{V3d} > -0.5.$$

A value within this range is a preferred condition to eliminate chromatic aberration.

If the condition (11), TTL/f, is greater than 10, then it is difficult to achieve miniaturization. Accordingly, the value of TTL/f has to be at least less than 10. A preferred range is $$6 < \frac{TTL}{f} < 10.$$

A value within this range is a preferred condition in minimizing the photographing lens.

TABLE 5

| Lens No. | Surface Index | Radius of Curvature R (mm) | Thickness/ Distance D (mm) | Refractive Index Nd | Abbe No. Vd |
|---|---|---|---|---|---|
| | Object Surface | ∞ | ∞ | | |
| L1 | 1 | 24.003 | 0.996 | 1.74 | 52 |
| | 2 | 2.721 | 1.602 | | |
| L2 | 3 | −187.88 | 3.283 | 1.65 | 19 |
| | 4 | 59.08 | 2.119 | | |
| L3 | 5 | 4.979 | 3.282 | 1.63 | 60 |
| | 6 | −4.979 | 0.219 | | |
| ST | 7(ST) | ∞ | −0.089 | | |
| L4 | 8 | 3.45 | 1.628 | 1.54 | 55 |
| | 9 | −2.594 | 0.082 | | |
| L5 | 10 | −5.665 | 0.417 | 1.63 | 23 |
| | 11 | 2.632 | 1.095 | | |
| OF | 12 | ∞ | 0.21 | 1.52 | 54.5 |
| | 13 | ∞ | 0.53 | | |
| G | 14 | ∞ | 0.4 | 1.5 | 64.2 |
| | 15 | ∞ | 0.2 | | |

TABLE 6

| Surface Index | K | E4 | E6 | E8 | E10 | E12 |
|---|---|---|---|---|---|---|
| 3 | 0 | −1.382E−03 | −5.94E−05 | −2.040E−05 | 1.329E−05 | −1.48E−06 |
| 4 | −3.239 | 2.611E−03 | −5.595E−04 | 4.714E−04 | −9.447E−05 | 8.522E−06 |
| 8 | −0.32 | −6.592E−04 | −0.038 | 0.055 | −0.044 | 0.013 |
| 10 | 4.844 | −0.045 | 0.047 | −0.013 | −6.034E−04 | 8.925E−04 |
| 11 | −0.475 | −0.047 | 0.061 | −0.055 | 0.043 | −0.015 |

Fourth Embodiment

Figure 4D:
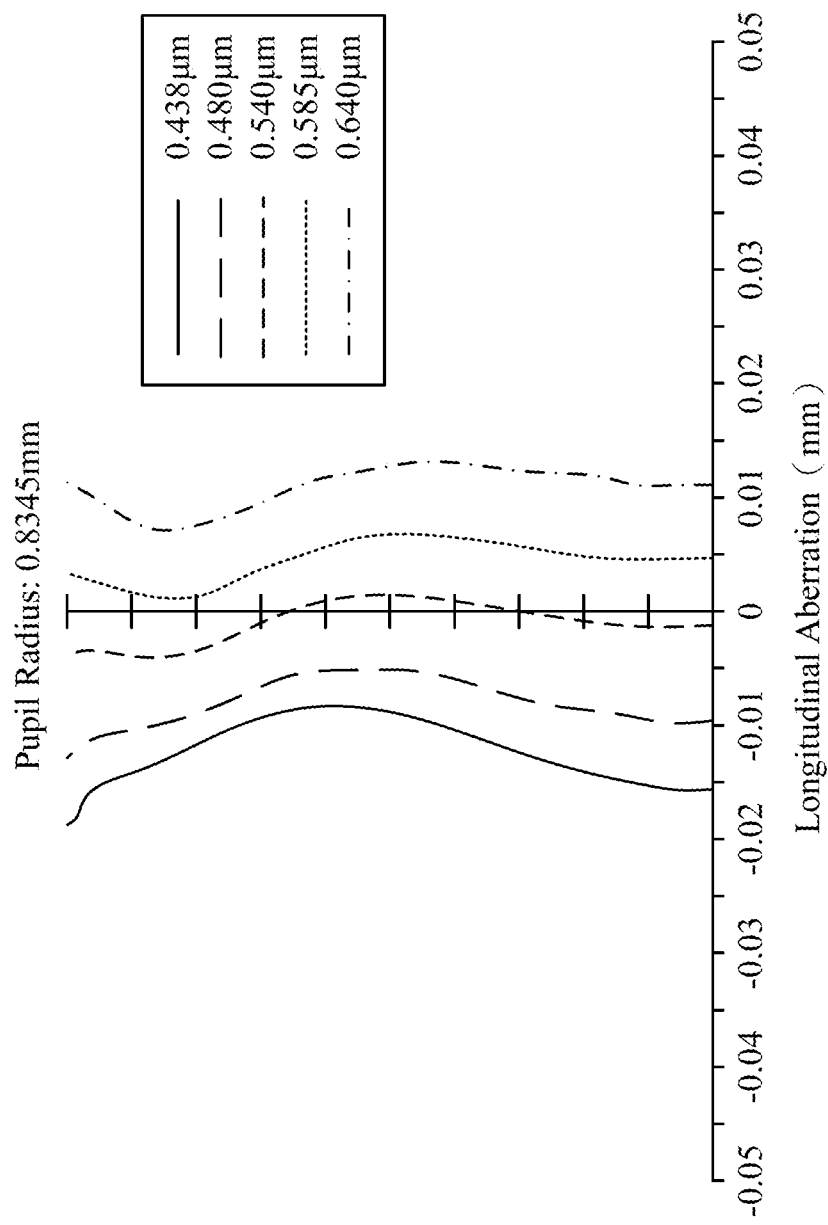

Please refer to FIGS. 4A to 4D. FIG. 4A is a schematic diagram showing a photographing lens according to a fourth embodiment of the present disclosure and FIGS. 4B to 4D are diagrams illustrating field curvature, distortion, and longitudinal aberration according to the fourth embodiment of the present disclosure, respectively. In the fourth embodiment, the photographing lens is an optical structure with six lenses (i.e., L1 to L6). The object-side surface of the second lens L2 is convex in a paraxial region thereof and the image-side surface of the second lens L2 is concave in a paraxial region thereof. The object-side surface of the fifth lens L5 is concave in a paraxial region thereof and the image-side surface of the fifth lens L5 is convex in a paraxial region thereof. In Table 7, related parameters of each lens of the photographing lens shown in FIG. 4A are illustrated. In Table 8, related parameters of aspheric surfaces of each lens of the photographing lens in Table 7 are illustrated. The Petzval sum is 0.07, i.e., between −1 and 1. F-number of the photographing lens is 2.4, the effective focal length of the photographing lens is 4.006 mm and the maximum effective diameter (i.e., L1R1Rm or ΦL1) of the first lens L1 is 12.80 mm. Accordingly, $$\frac{f}{L1R1Rm} = 0.313,$$

i.e., between 0.2 and 1. The Abbe number of the fourth lens L4 is 56.1 and the Abbe number of the fifth lens L5 is 20.4. Accordingly, (V4d−V5d)=35.7, i.e., between 23 and 40. The distance between an edge on L1R2 surface and an edge on L2R1 surface, along the optical axis, is 0.61 mm, i.e., between 0 and 1 mm. The focal length of the third lens L3 is 5.229 mm. Accordingly, $$\frac{f3}{f} = 1.305,$$

i.e., between 1 and 2.8. The central thickness T2 of the second lens L2 is 4.301 mm and the total length of the photographing lens is 17.787 mm. Accordingly, T2/TTL=0.242, i.e., between 0.2 and 1, and TTL/f=4.440, i.e., between 4.4 and 10. CRA is 36.9 degrees, i.e., between 25 and 40 degrees. IH is 3.758 mm. Accordingly, $$\frac{\phi L1}{IH} = 3.406,$$

i.e., between 2 and 4.5, and $$\frac{T2}{IH} = 1.44,$$

i.e., between 0.5 and 2.5. The Abbe number of the first lens L1 is 68.6 and the Abbe number of the third lens L3 is 31.6. Accordingly, $$\frac{V1d}{V3d} = 2.17,$$

i.e., between 0.5 and 3.

If the condition (6), TTL/f, is greater than 10, then it is difficult to achieve miniaturization. Accordingly, the value of TTL/f has to be at least less than 10. A preferred range is $$4 < \frac{TTL}{f} < 10.$$

A value within this range is a preferred condition in minimizing the photographing lens.

TABLE 7

| Lens No. | Surface Index | Radius of Curvature R (mm) | Thickness/ Distance D (mm) | Refractive Index Nd | Abbe No. Vd |
|---|---|---|---|---|---|
| | Object Surface | ∞ | ∞ | | |
| L1 | 1 | 11.385 | 1.898 | 1.59 | 68.6 |
| | 2 | 4.622 | 2.466 | | |
| L2 | 3 | 8.388 | 4.301 | 1.65 | 21.5 |
| | 4 | 2.807 | 0.876 | | |
| L3 | 5 | 9.626 | 1.599 | 1.68 | 31.6 |
| | 6 | −5.369 | 0.277 | | |
| ST | 7(ST) | ∞ | −0.147 | | |

TABLE 7-continued

| Lens No. | Surface Index | Radius of Curvature R (mm) | Thickness/ Distance D (mm) | Refractive Index Nd | Abbe No. Vd |
|---|---|---|---|---|---|
| L4 | 8 | 3.575 | 1.709 | 1.54 | 56.1 |
|  | 9 | −3.233 | 0.200 |  |  |
| L5 | 10 | −3.832 | 1.301 | 1.66 | 20.4 |
|  | 11 | −26.918 | 0.965 |  |  |
| L6 | 12 | 8.920 | 1.040 | 1.54 | 56.1 |
|  | 13 | 3.288 | 0.991 |  |  |
| OF | 14 | ∞ | 0.210 | 1.52 | 64.2 |
|  | 15 | ∞ | 0.300 |  |  |

TABLE 8

| Surface Index | K | E4 | E6 | E8 | E10 | E12 |
|---|---|---|---|---|---|---|
| 3 | −0.26 | −5.32E−04 | −3.67E−05 | −6.98E−06 | 1.91E−07 | 0.00E+00 |
| 4 | 0.16 | 8.75E−03 | −7.92E−04 | −6.25E−06 | −1.54E−04 | 0.00E+00 |
| 5 | 9.64 | 4.46E−03 | −8.82E−04 | −1.89E−04 | −6.74E−05 | 0.00E+00 |
| 6 | −0.11 | −3.10E−03 | 6.95E−04 | −5.44E−04 | 1.13E−04 | 0.00E+00 |
| 8 | 1.37 | −1.33E−02 | −1.32E−03 | −5.73E−04 | −3.10E−04 | 0.00E+00 |
| 9 | 1.03 | −1.88E−02 | 1.01E−02 | −3.66E−03 | 4.55E−04 | 0.00E+00 |
| 10 | 1.90 | −4.36E−03 | 1.28E−02 | −5.01E−03 | 9.00E−04 | −2.98E−06 |
| 11 | 99.77 | 8.47E−03 | 7.59E−03 | −1.96E−03 | 3.66E−04 | −2.57E−05 |
| 12 | −103.50 | −3.33E−02 | 8.11E−04 | 1.30E−03 | −3.84E−04 | 3.83E−05 |
| 13 | −7.56 | −2.18E−02 | 2.97E−03 | −3.78E−04 | 2.47E−05 | −7.93E−07 |

Fifth Embodiment

Figure 5D:
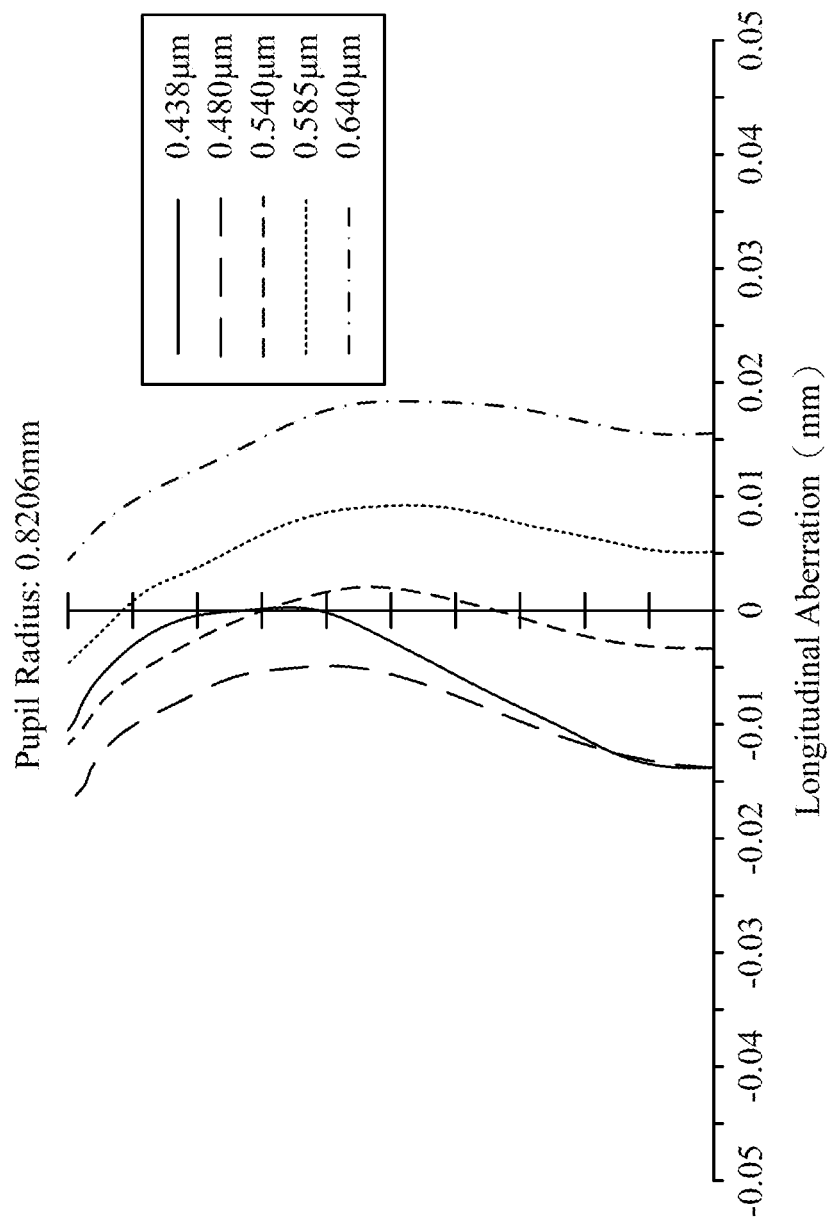

Please refer to FIGS. 5A to 5D. FIG. 5A is a schematic diagram showing a photographing lens according to a fifth embodiment of the present disclosure and FIGS. 5B to 5D are diagrams illustrating field curvature, distortion, and longitudinal aberration according to the fifth embodiment of the present disclosure, respectively. In the fifth embodiment, the photographing lens is an optical structure with six lenses (i.e., L1 to L6). The object-side surface of the second lens L2 is convex in a paraxial region thereof and the image-side surface of the second lens L2 is concave in a paraxial region thereof. The fifth lens L5 is a biconcave lens. In Table 9, related parameters of each lens of the photographing lens shown in FIG. 5A are illustrated. In Table 10, related parameters of aspheric surfaces of each lens of the photographing lens in Table 9 are illustrated. The Petzval sum is 0.073, i.e., between −1 and 1. F-number of the photographing lens is 2.4, the effective focal length of the photographing lens is 3.939 mm and the maximum effective diameter (i.e., L1R1Rm or ΦL1) of the first lens L1 is 11.86 mm. Accordingly, $$\frac{f}{L1R1Rm} = 0.332,$$

i.e., between 0.2 and 1. The Abbe number of the fourth lens L4 is 56.1 and the Abbe number of the fifth lens L5 is 20.4. Accordingly, (V4d−V5d)=35.7, i.e., between 23 and 40. The distance between an edge on L1R2 surface and an edge on L2R1 surface, along the optical axis, is 0.64 mm, i.e., between 0 and 1 mm. The focal length of the third lens L3 is 4.504 mm. Accordingly, $$\frac{f3}{f} = 1.143,$$

i.e., between 1 and 2.8. The central thickness T2 of the second lens L2 is 3.909 mm and the total length of the photographing lens is 17.991 mm. Accordingly, T2/TTL=0.217, i.e., between 0.2 and 1, and TTL/f=4.567, i.e., between 4.4 and 10. CRA is 37.8 degrees, i.e., between 25 and 40 degrees. IH is 3.758 mm. Accordingly, $$\frac{\phi L1}{IH} = 3.156,$$

i.e., between 2 and 4.5, and $$\frac{T2}{IH} = 1.04,$$

i.e., between 0.5 and 2.5. The Abbe number of the first lens L1 is 67 and the Abbe number of the third lens L3 is 31.6. Accordingly, $$\frac{V1d}{V3d} = 2.12,$$

i.e., between 0.5 and 3.

If the condition (7), CRA, is less than 25 degrees, it is difficult to let the photographing lens have exit pupil position and principal point closer to the image plane. Accordingly, CRA has to be at least greater than 25 degrees. A preferred range is 25°<CRA<40°. A value within this range can let the photographing lens have exit pupil position and principal point closer to the image plane to effectively shorten the rear focal length of the photographing lens and keep miniaturization.

TABLE 9

| Lens No. | Surface Index | Radius of Curvature R (mm) | Thickness/ Distance D (mm) | Refractive Index Nd | Abbe No. Vd |
|---|---|---|---|---|---|
|  | Object Surface | ∞ | ∞ |  |  |
| L1 | 1 | 10.463 | 0.804 | 1.59 | 67 |
|  | 2 | 5.018 | 2.652 |  |  |

TABLE 9-continued

| Lens No. | Surface Index | Radius of Curvature R (mm) | Thickness/ Distance D (mm) | Refractive Index Nd | Abbe No. Vd |
|---|---|---|---|---|---|
| L2 | 3 | 7.602 | 3.909 | 1.65 | 21.5 |
|  | 4 | 2.356 | 1.117 |  |  |
| L3 | 5 | 4.813 | 2.976 | 1.68 | 31.6 |
|  | 6 | −6.538 | 0.238 |  |  |
| ST | 7(ST) | ∞ | −0.108 |  |  |
| L4 | 8 | 3.968 | 1.527 | 1.54 | 56.1 |
|  | 9 | −3.592 | 0.199 |  |  |
| L5 | 10 | −4.970 | 0.990 | 1.66 | 20.4 |
|  | 11 | 12.771 | 1.048 |  |  |
| L6 | 12 | 7.762 | 1.148 | 1.54 | 56.1 |
|  | 13 | 3.913 | 0.982 |  |  |
| OF | 14 | ∞ | 0.210 | 1.52 | 64.2 |
|  | 15 | ∞ | 0.300 |  |  |

TABLE 10

| Surface Index | K | E4 | E6 | E8 | E10 | E12 |
|---|---|---|---|---|---|---|
| 3 | −0.43 | −1.34E−03 | −8.44E−05 | 1.01E−06 | 4.07E−08 | 0.00E+00 |
| 4 | −0.46 | −4.45E−03 | −1.11E−03 | −1.72E−06 | −3.87E−06 | 0.00E+00 |
| 5 | −2.71 | −1.40E−04 | −4.17E−04 | −9.70E−05 | 1.78E−05 | 0.00E+00 |
| 6 | −1.93 | −1.99E−03 | 2.45E−03 | −7.95E−04 | 2.49E−04 | 0.00E+00 |
| 8 | 2.75 | −1.12E−02 | 1.20E−03 | −9.81E−04 | 3.75E−05 | 0.00E+00 |
| 9 | 1.12 | −2.74E−02 | 1.87E−02 | −7.56E−03 | 1.29E−03 | 0.00E+00 |
| 10 | 2.83 | −1.86E−02 | 2.18E−02 | −1.06E−02 | 1.81E−03 | 3.99E−05 |
| 11 | 41.65 | 5.64E−03 | 7.80E−03 | −3.21E−03 | 4.24E−04 | −1.01E−05 |
| 12 | −75.79 | −1.60E−02 | −8.34E−04 | 6.93E−04 | −1.10E−04 | 2.92E−07 |
| 13 | −0.73 | −2.91E−02 | 4.01E−03 | −5.24E−04 | 4.19E−05 | −1.79E−06 |

Sixth Embodiment

Figure 6D:
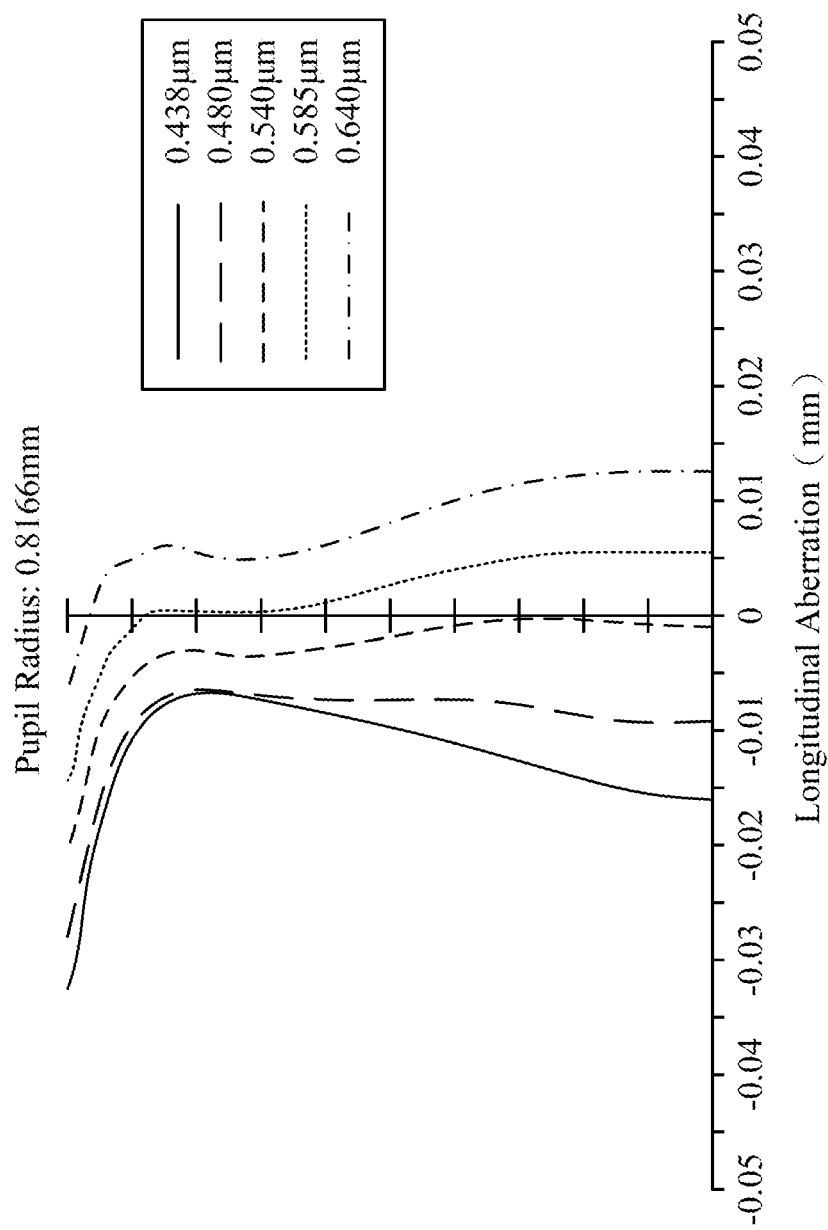

Please refer to FIGS. 6A to 6D. FIG. 6A is a schematic diagram showing a photographing lens according to a sixth embodiment of the present disclosure and FIGS. 6B to 6D are diagrams illustrating field curvature, distortion, and longitudinal aberration according to the sixth embodiment of the present disclosure, respectively. In the sixth embodiment, the photographing lens is an optical structure with six lenses (i.e., L1 to L6). The object-side surface of the second lens L2 is convex in a paraxial region thereof and the image-side surface of the second lens L2 is concave in a paraxial region thereof. The fifth lens L5 is a biconcave lens. In Table 11, related parameters of each lens of the photographing lens shown in FIG. 6A are illustrated. In Table 12, related parameters of aspheric surfaces of each lens of the photographing lens in Table 11 are illustrated. The Petzval sum is 0.077, i.e., between −1 and 1. F-number of the photographing lens is 2.4, the effective focal length of the photographing lens is 3.920 mm and the maximum effective diameter (i.e., L1R1Rm) of the first lens L1 is 11.66 mm. Accordingly, $$\frac{f}{L1R1Rm} = 0.336,$$

i.e., between 0.2 and 1. The Abbe number of the fourth lens L4 is 56.1 and the Abbe number of the fifth lens L5 is 21.5. Accordingly, (V4d−V5d)=34.6, i.e., between 23 and 40. The distance between an edge on L1R2 surface and an edge on L2R1 surface, along the optical axis, is 0.53 mm, i.e., between 0 and 1 mm. The focal length of the third lens L3 is 4.552 mm. Accordingly, $$\frac{f3}{f} = 1.161,$$

i.e., between 1 and 2.8. The central thickness T2 of the second lens L2 is 4.701 mm and the total length of the photographing lens is 17.989 mm. Accordingly, T2/TTL=0.261, i.e., between 0.2 and 1, and TTL/f=4.589, i.e., between 4.4 and 10. CRA is 38.8 degrees, i.e., between 25 and 40 degrees. IH is 3.758 mm. Accordingly, $$\frac{\phi L1}{IH} = 3.103,$$

i.e., between 2 and 4.5, and $$\frac{T2}{IH} = 1.25,$$

i.e., between 0.5 and 2.5. The Abbe number of the first lens L1 is 75.1 and the Abbe number of the third lens L3 is 32.7. Accordingly, $$\frac{V1d}{V3d} = 2.297,$$

i.e., between 0.5 and 3.

If the condition (5), T2/TTL, is less than 0.2, then it is difficult to achieve miniaturization. Accordingly, the value of T2/TTL has to be at least greater than 0.2. A preferred range is $$1 > \frac{T2}{TTL} > 0.2.$$

A value within this range is a preferred condition in minimizing the photographing lens.

TABLE 11

| Lens No. | Surface Index | Radius of Curvature R (mm) | Thickness/ Distance D (mm) | Refractive Index Nd | Abbe No. Vd |
|---|---|---|---|---|---|
|  | Object Surface | ∞ | ∞ |  |  |
| L1 | 1 | 13.511 | 0.726 | 1.56 | 75.1 |
|  | 2 | 5.233 | 2.257 |  |  |

TABLE 11-continued

| Lens No. | Surface Index | Radius of Curvature R (mm) | Thickness/ Distance D (mm) | Refractive Index Nd | Abbe No. Vd |
|---|---|---|---|---|---|
| L2 | 3 | 9.176 | 4.701 | 1.65 | 21.5 |
|  | 4 | 2.698 | 0.996 |  |  |
| L3 | 5 | 5.523 | 2.632 | 1.68 | 32.7 |
|  | 6 | −5.788 | 0.095 |  |  |
| ST | 7(ST) | ∞ | 0.035 |  |  |
| L4 | 8 | 4.108 | 1.463 | 1.54 | 56.1 |
|  | 9 | −3.456 | 0.200 |  |  |
| L5 | 10 | −4.337 | 1.509 | 1.65 | 21.5 |
|  | 11 | 19.968 | 1.028 |  |  |
| L6 | 12 | 6.545 | 0.857 | 1.54 | 56.1 |
|  | 13 | 3.319 | 0.681 |  |  |
| OF | 14 | ∞ | 0.210 | 1.52 | 64.2 |
|  | 15 | ∞ | 0.600 |  |  |

TABLE 12

| Surface Index | K | E4 | E6 | E8 | E10 | E12 |
|---|---|---|---|---|---|---|
| 3 | 1.17 | −8.06E−04 | −5.53E−05 | −1.82E−06 | 6.86E−08 | 0.00E+00 |
| 4 | −0.03 | 2.16E−03 | −1.39E−03 | 9.60E−06 | −5.63E−05 | 0.00E+00 |
| 5 | −0.77 | 7.99E−04 | −7.70E−04 | −5.14E−05 | −2.74E−05 | 0.00E+00 |
| 6 | −4.92 | −1.10E−03 | 3.18E−04 | −4.66E−04 | 2.84E−04 | 0.00E+00 |
| 8 | 2.97 | −7.51E−03 | −1.28E−03 | −1.39E−03 | 3.15E−04 | 0.00E+00 |
| 9 | 0.74 | −3.54E−02 | 2.17E−02 | −8.33E−03 | 1.45E−03 | 0.00E+00 |
| 10 | 4.66 | −2.47E−02 | 2.49E−02 | −9.74E−03 | 2.18E−03 | −5.20E−05 |
| 11 | 41.15 | 1.70E−03 | 7.07E−03 | −2.03E−03 | 2.89E−04 | −1.16E−05 |
| 12 | −49.45 | −2.65E−02 | 2.12E−05 | 6.28E−04 | −7.78E−05 | −5.00E−06 |
| 13 | −2.70 | −3.20E−02 | 5.03E−03 | −6.56E−04 | 5.29E−05 | −2.31E−06 |

Formulas of the present disclosure center on $$1 \leq \frac{f3}{f} \leq 2.8,$$

$$40 \geq (V4d - V5d) \geq 23,$$

$$3 > \frac{V1d}{V3d} > 0.5,$$

$$4 < \frac{TTL}{f} < 10,$$

$$25° < CRA < 40°, \text{ and}$$

$$1 > \frac{T2}{TTL} > 0.2.$$

The embodiments of the present disclosure also fall within ranges of other formulas. The formula $$1 \leq \frac{f3}{f} \leq 2.8$$

is helpful in achieving the balance between the optical performance and the manufacturability. The formulas $$4 < \frac{TTL}{f} < 10 \text{ and } 1 > \frac{T2}{TTL} > 0.2.$$

are helpful in miniaturization of the photographing lens. The formulas 40≥(V4d−V5d)≥23 and $$3 > \frac{V1d}{V3d} > 0.5$$

make the photographing lens have a better ability to eliminate chromatic aberration. The formula 25°<CRA<40° can let the photographing lens have exit pupil position and principal point closer to the image plane to effectively shorten the rear focal length of the photographing lens and keep miniaturization.

While the preferred embodiments of the present disclosure have been illustrated and described in detail, various modifications and alterations can be made by persons skilled in this art. The embodiment of the present disclosure is therefore described in an illustrative but not restrictive sense. It is intended that the present disclosure should not be limited to the particular forms as illustrated, and that all modifications and alterations which maintain the spirit and realm of the present disclosure are within the scope as defined in the appended claims.

What is claimed is:

1. A photographing lens comprising, in order from an object side to an image side along an optical axis:
   a first lens, which is a meniscus lens with negative refractive power;
   a second lens, which is a lens with negative refractive power, in which an image-side surface of the second lens is concave;
   a third lens, which is a lens with positive refractive power, in which an image-side surface of the third lens is convex;
   a fourth lens, which is a lens with positive refractive power; and
   a fifth lens, which is a lens with negative refractive power, in which an object-side surface of the fifth lens is concave,
   wherein the photographing lens satisfies the following condition:

$$1 > \frac{T2}{TTL} > 0.2,$$

wherein T2 is central thickness of the second lens and TTL is a total length of the photographing lens.

2. The photographing lens according to claim 1, wherein an object-side surface of the first lens is convex and an image-side surface of the first lens is concave, an object-side surface of the second lens is concave, an object-side surface of the third lens is convex, and the fourth lens is a biconvex lens.

3. The photographing lens according to claim 1, further comprising:
  a sixth lens disposed between the fifth lens and an image plane, wherein the sixth lens is a lens with negative refractive power, and an object-side surface of the sixth lens is convex and an image-side surface of the sixth lens is concave.

4. The photographing lens according to claim 3, wherein an object-side surface of the second lens is convex and an image-side surface of the fifth lens is convex.

5. The photographing lens according to claim 1, wherein the photographing lens satisfies the following condition:

$$-1 \le \frac{1}{n1f1} + \frac{1}{n2f2} + \frac{1}{n3f3} + \frac{1}{n4f4} + \frac{1}{n5f5} \le 1;$$

and $$25° < CRA < 40°,$$

wherein n1 is refractive index of the first lens, n2 is refractive index of the second lens, n3 is refractive index of the third lens, n4 is refractive index of the fourth lens, n5 is refractive index of the fifth lens, f1 is focal length of the first lens, f2 is focal length of the second lens, f3 is focal length of the third lens, f4 is focal length of the fourth lens, f5 is focal length of the fifth lens, and CRA is a maximum incident angle of chief ray onto an image plane.

6. The photographing lens according to claim 1, wherein the photographing lens satisfies the following condition:

$$0.2 \le \frac{f}{\phi L1} \le 1;$$

$$4.5 > \frac{\phi L1}{IH} > 2;\text{ and}$$

$$2.5 > \frac{T2}{IH} > 0.5,$$

wherein f is effective focal length of the photographing lens, φL1 is a maximum effective diameter of the first lens, IH is a maximum image height on an image plane carried out by the photographing lens, and T2 is the central thickness of the second lens.

7. The photographing lens according to claim 1, wherein the photographing lens satisfies the following condition:

$$3 > \frac{V1d}{V3d} > 0.5;$$

and $$40 \ge (V4d - V5d) \ge 23,$$

wherein V1d is Abbe number of the first lens, V3d is Abbe number of the third lens, V4d is Abbe number of the fourth lens, and V5d is Abbe number of the fifth lens.

8. The photographing lens according to claim 1, wherein a distance between an edge on an image-side surface of the first lens and an edge on an object-side surface of the second lens, along the optical axis, is 0 to 1 mm.

9. The photographing lens according to claim 1, wherein the photographing lens satisfies the following condition:

$$1 \le \frac{f3}{f} \le 2.8;\text{ and}$$

$$4 < \frac{TTL}{f} < 10,$$

wherein f3 is focal length of the third lens, f is effective focal length of the photographing lens, and TTL is the total length of the photographing lens.

10. The photographing lens according to claim 1, wherein the first lens and the third lens are spherical glass lenses, and the second lens, the fourth lens, and the fifth lens are plastic lenses, and an image-side surface of the fourth lens is a spherical surface.

11. A photographing lens comprising, in order from an object side to an image side along an optical axis:
  a first lens, which is a meniscus lens with negative refractive power;
  a second lens, which is a lens with negative refractive power, in which an image-side surface of the second lens is concave;
  a third lens, which is a lens with positive refractive power, in which an image-side surface of the third lens is convex;
  an aperture stop;
  a fourth lens, which is a lens with positive refractive power; and
  a fifth lens, which is a lens with negative refractive power, in which an object-side surface of the fifth lens is concave,
  wherein the photographing lens satisfies the following condition:

$$4.5 > \frac{\phi L1}{IH} > 2,$$

wherein φL1 is a maximum effective diameter of the first lens and IH is a maximum image height on an image plane carried out by the photographing lens,
wherein the photographing lens satisfies the following condition:

$$-1 \le \frac{1}{n1f1} + \frac{1}{n2f2} + \frac{1}{n3f3} + \frac{1}{n4f4} + \frac{1}{n5f5} \le 1;$$

and $$25° < CRA < 40°,$$

wherein n1 is refractive index of the first lens, n2 is refractive index of the second lens, n3 is refractive index of the third lens, n4 is refractive index of the fourth lens, n5 is refractive index of the fifth lens, f1 is focal length of the first lens, f2 is focal length of the second lens, f3 is focal length of the third lens, f4 is focal length of the fourth lens, f5 is focal length of the fifth lens, and CRA is a maximum incident angle of chief ray onto an image plane.

12. The photographing lens according to claim 11, wherein an object-side surface of the first lens is convex and an image-side surface of the first lens is concave, an object-side surface of the second lens is concave, an object-side surface of the third lens is convex, and the fourth lens is a biconvex lens.

13. The photographing lens according to claim 11, further comprising:

a sixth lens disposed between the fifth lens and an image plane, wherein the sixth lens is a lens with negative refractive power, and an object-side surface of the sixth lens is convex and an image-side surface of the sixth lens is concave.

14. The photographing lens according to claim 13, wherein an object-side surface of the second lens is convex and an image-side surface of the fifth lens is convex.

15. The photographing lens according to claim 11, wherein the photographing lens satisfies the following condition:

$$0.2 \leq \frac{f}{\phi L1} \leq 1; \text{ and}$$

$$2.5 > \frac{T2}{IH} > 0.5,$$

wherein f is effective focal length of the photographing lens, $\phi L1$ is the maximum effective diameter of the first lens, IH is the maximum image height on the image plane carried out by the photographing lens, and T2 is central thickness of the second lens.

16. The photographing lens according to claim 11, wherein the photographing lens satisfies the following condition:

$$3 > \frac{V1d}{V3d} > 0.5;$$

and $$40 \geq (V4d - V5d) \geq 23,$$

wherein V1$d$ is Abbe number of the first lens, V3$d$ is Abbe number of the third lens, V4$d$ is Abbe number of the fourth lens, and V5$d$ is Abbe number of the fifth lens.

17. The photographing lens according to claim 11, wherein a distance between an edge on an image-side surface of the first lens and an edge on an object-side surface of the second lens, along the optical axis, is 0 to 1 mm.

18. The photographing lens according to claim 11, wherein the photographing lens satisfies the following condition:

$$1 \leq \frac{f3}{f} \leq 2.8; \text{ and}$$

$$4 < \frac{TTL}{f} < 10,$$

wherein f3 is focal length of the third lens, f is effective focal length of the photographing lens, and TTL is a total length of the photographing lens.

19. The photographing lens according to claim 11, wherein the first lens and the third lens are spherical glass lenses, and the second lens, the fourth lens, and the fifth lens are plastic lenses, and an image-side surface of the fourth lens is a spherical surface.

* * * * *